United States Patent
Clary et al.

(10) Patent No.: US 6,940,891 B2
(45) Date of Patent: Sep. 6, 2005

(54) HIGH PRECISION OPTICAL IMAGING SYSTEMS AND RELATED SYSTEMS

(75) Inventors: Thomas R. Clary, Issaquah, WA (US); Joseph A. Franklin, Vancouver, WA (US); Kyle S. Johnston, Sammamish, WA (US); Joseph D. Ridge, Issaquah, WA (US)

(73) Assignee: Metron Systems, Inc., Snoqualmie, WA (US)

( * ) Notice: Subject to any disclaimer, the term of this patent is extended or adjusted under 35 U.S.C. 154(b) by 0 days.

(21) Appl. No.: 10/693,229

(22) Filed: Oct. 24, 2003

(65) Prior Publication Data

US 2005/0053113 A1 Mar. 10, 2005

Related U.S. Application Data

(60) Provisional application No. 60/421,719, filed on Oct. 28, 2002.

(51) Int. Cl.[7] .................................................. H01S 3/08
(52) U.S. Cl. ..................................... 372/107; 372/108
(58) Field of Search ............................... 372/108, 107; 359/705; 356/320; 250/231.12; 324/207.25; 396/427

(56) References Cited

U.S. PATENT DOCUMENTS

| | | | |
|---|---|---|---|
| 1,540,752 A | | 6/1925 | Bielicke ...................... 359/774 |
| 3,718,751 A | * | 2/1973 | Landre et al. .............. 348/339 |
| 3,853,407 A | * | 12/1974 | Dewey, Jr. .................. 356/320 |
| 3,991,426 A | * | 11/1976 | Flom et al. ................ 623/6.12 |
| 3,997,245 A | * | 12/1976 | Uesugi ........................ 359/705 |
| 4,204,760 A | * | 5/1980 | Kobayashi ................... 396/73 |
| 4,277,141 A | | 7/1981 | Kleiber ........................ 359/855 |
| 4,498,778 A | | 2/1985 | White ........................ 356/606 |
| 4,567,347 A | | 1/1986 | Ito et al. ................. 219/124.34 |
| 4,628,469 A | | 12/1986 | White ........................ 702/152 |

(Continued)

FOREIGN PATENT DOCUMENTS

| | | | |
|---|---|---|---|
| EP | 0377973 | 7/1990 | ............ G06K/7/10 |
| EP | 0618472 | 10/1994 | ........... G02B/27/00 |
| JP | 03198650 | 8/1991 | .......... H02K/37/12 |

OTHER PUBLICATIONS

A Real–time Optical Profile Sensor For Robot Arc Welding, Oomen et al, Proceedings Of The SPIE, vol. 449, Intelligent Robots: RoViSeC3, 1983 pp. 62–71, Nov. 1983.

Science Applications International Corporation, "Recent Applications of Laser Line Scan Technology and Data Processing", SAIC Science and Technology Trends, 1998, pp. 190–195, no month.

"Motor/Polygon Speed Stability Definition and Measurement", Lincoln Laser Scanning Systems, 1993, Appl. Note#214, pp., 1–4, Oct. 1993.

Planar Substrate Surface Plasmon Resonance Probe with Multivariate Calibration (section entitled "2. Theory of Light Pipe SPR Sensors"), Ph.D. Dissertation, Univ. Washington, 1996, Kyle S. Johnston, 25 pages, no month.

*Primary Examiner*—Minsun Harvey
*Assistant Examiner*—Armando Rodriguez
(74) *Attorney, Agent, or Firm*—Reed Smith LLP; Matthew J. Esserman

(57) ABSTRACT

This disclosure describes the design and construction of high-precision off-axis optical imaging systems. The disclosure also describes the design and construction of high-precision mounting structures for rigidly holding optical elements in an optical imaging system. The disclosure further describes both a mechanism for highly stable mounting and a technique for high precision focusing of a detector in a complex optical setup. The disclosure even further describes both tooling and a technique used for focusing high precision optical imaging systems. The theory and use of at least these concepts are introduced by examining how these concepts aid the construction and use of a non-contact laser scanning system.

50 Claims, 15 Drawing Sheets

U.S. PATENT DOCUMENTS

| | | | |
|---|---|---|---|
| 4,639,140 A | 1/1987 | Lerat | 356/609 |
| 4,759,593 A | 7/1988 | Kessler | 359/208 |
| 4,863,268 A | 9/1989 | Clarke et al. | 356/237.2 |
| 4,880,299 A | 11/1989 | Hamada | 359/662 |
| 4,932,784 A | 6/1990 | Danneskiold-Samsoe | 356/602 |
| 4,979,816 A | 12/1990 | White | 356/4.07 |
| 5,004,929 A | 4/1991 | Kakinoki et al. | 250/559.06 |
| 5,138,154 A * | 8/1992 | Hotelling | 250/231.12 |
| 5,149,963 A | 9/1992 | Hassler, Jr. | 250/227.21 |
| 5,151,608 A | 9/1992 | Torii et al. | 250/559.38 |
| 5,157,486 A | 10/1992 | Turcheck, Jr. | 348/94 |
| 5,171,984 A | 12/1992 | Van Rosmalen | 250/236 |
| 5,245,182 A | 9/1993 | Van Rosmalen et al. | 250/236 |
| 5,450,219 A | 9/1995 | Gold et al. | 349/5 |
| 5,489,985 A | 2/1996 | Mochida et al. | 356/398 |
| 5,514,952 A * | 5/1996 | Parkinson | 324/207.25 |
| 5,550,668 A | 8/1996 | Appel et al. | 359/204 |
| 5,617,133 A | 4/1997 | Fisli | 347/261 |
| 5,739,912 A | 4/1998 | Ishii | 356/602 |
| 5,754,215 A | 5/1998 | Kataoka et al. | 347/235 |
| 5,777,311 A | 7/1998 | Keinath et al. | 235/462.27 |
| 5,789,743 A | 8/1998 | Van Rosmalen | 250/234 |
| 5,790,910 A * | 8/1998 | Haskin | 396/427 |
| 5,828,479 A | 10/1998 | Takano et al. | 359/201 |
| 5,864,394 A | 1/1999 | Jordan, III et al. | 356/237.2 |
| 6,046,801 A | 4/2000 | Liu et al. | 356/237.1 |
| 6,151,564 A | 11/2000 | Vescovi et al. | 702/150 |
| 6,205,406 B1 | 3/2001 | Hahn et al. | 702/85 |
| 6,441,908 B1 | 8/2002 | Johnston et al. | 356/602 |

\* cited by examiner

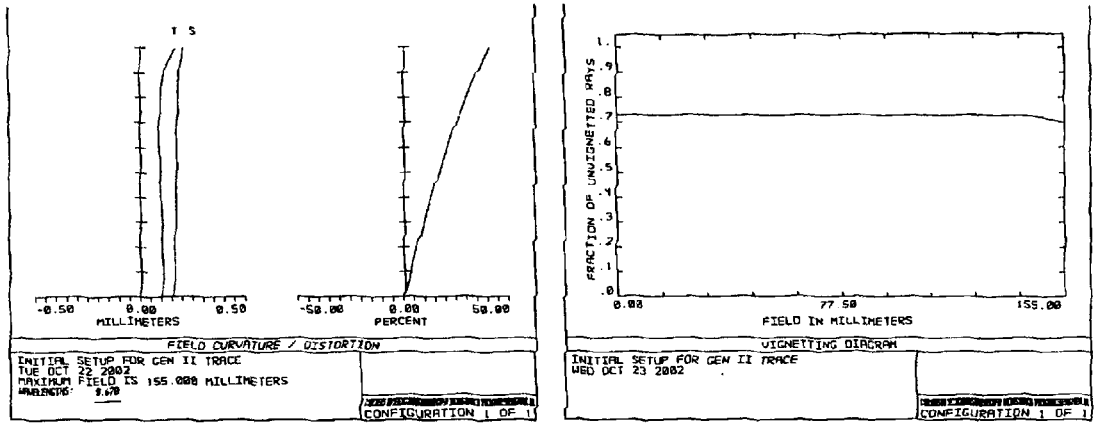
FIG. 5a  FIG. 5b
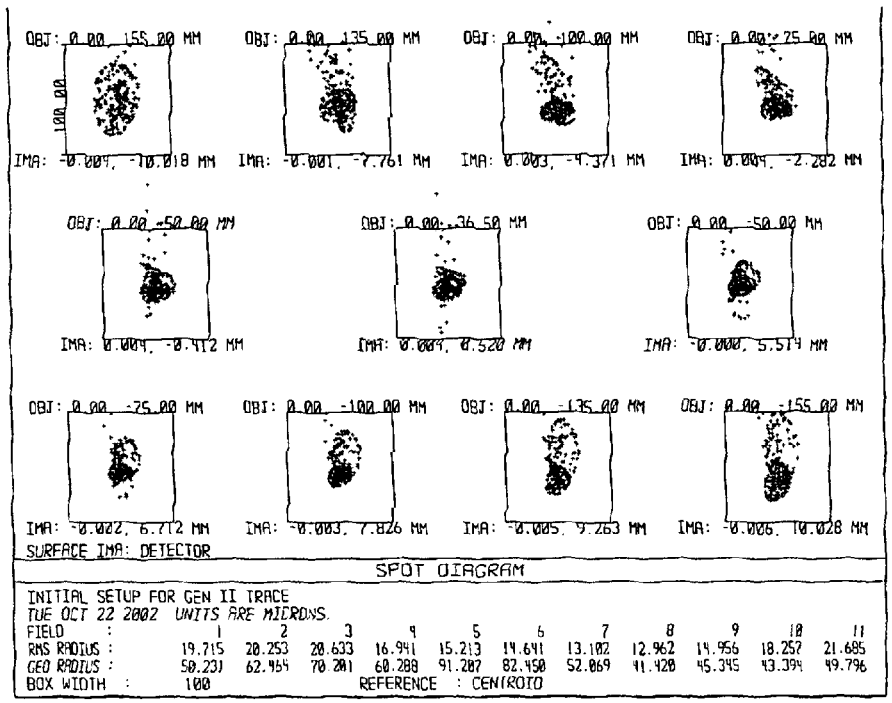
FIG. 6

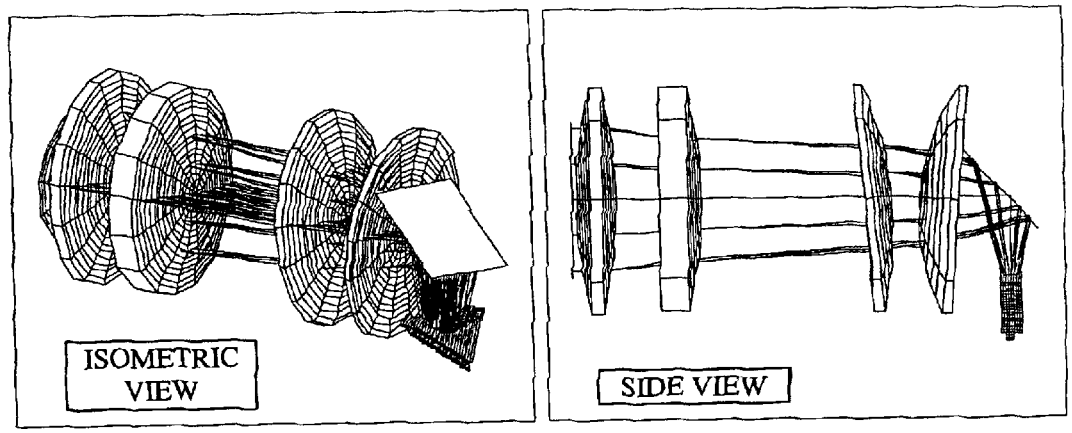
FIG. 8a  FIG. 8b
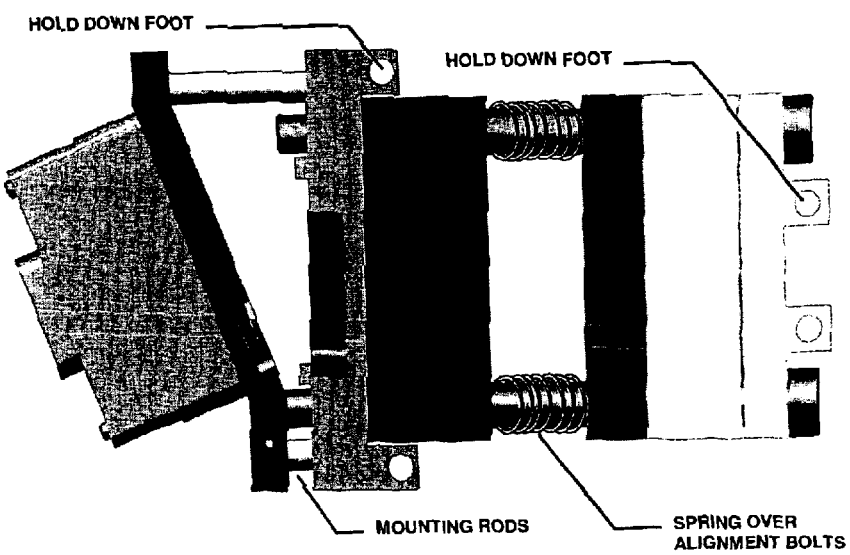
FIG. 9

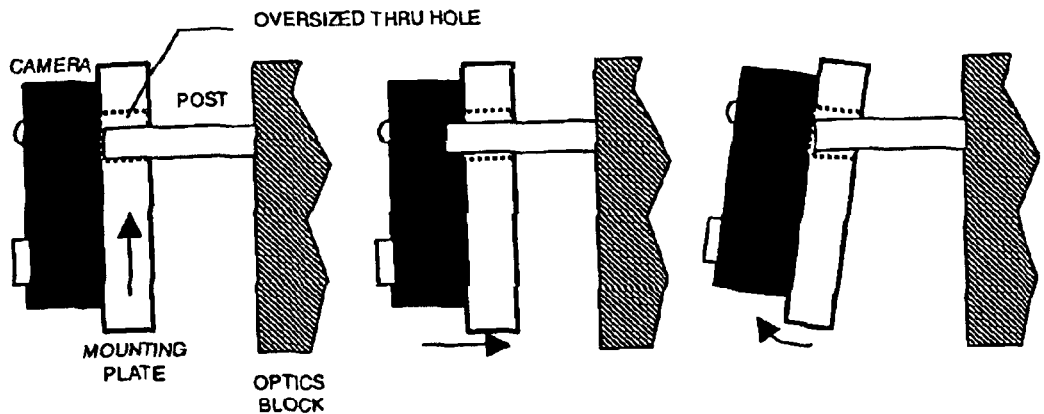
FIG. 16a  FIG. 16b  FIG. 16c
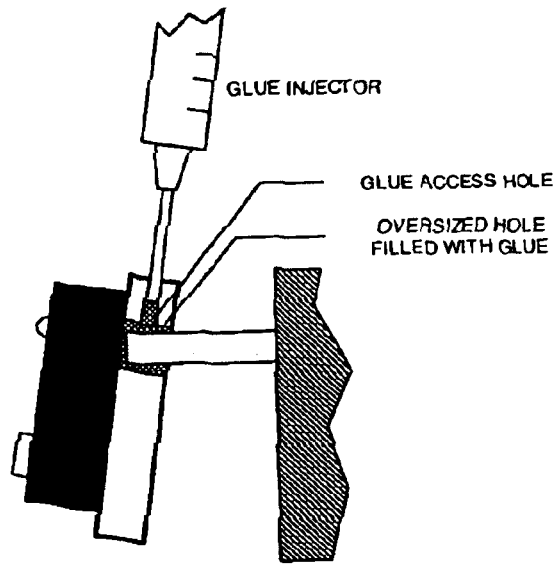
FIG. 17

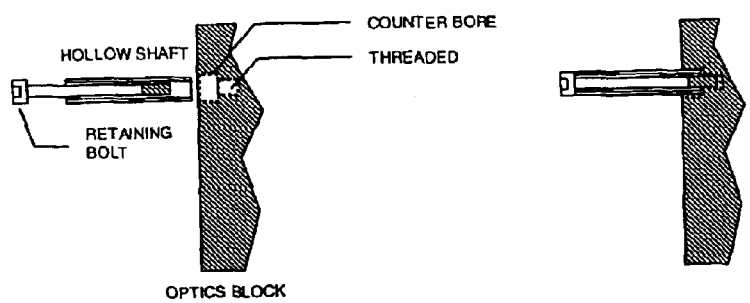
FIG. 18a  FIG. 18b
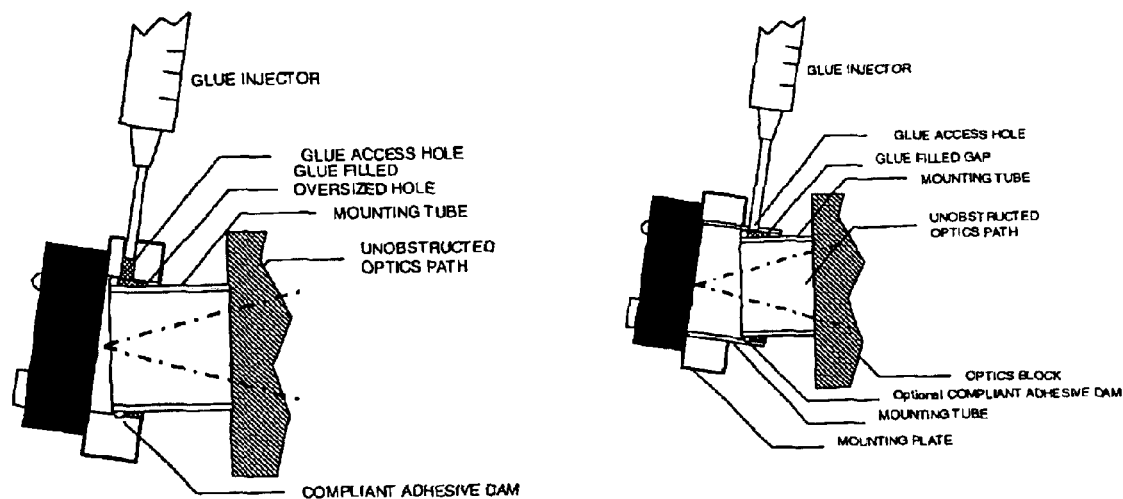
FIG. 19a  FIG. 19b

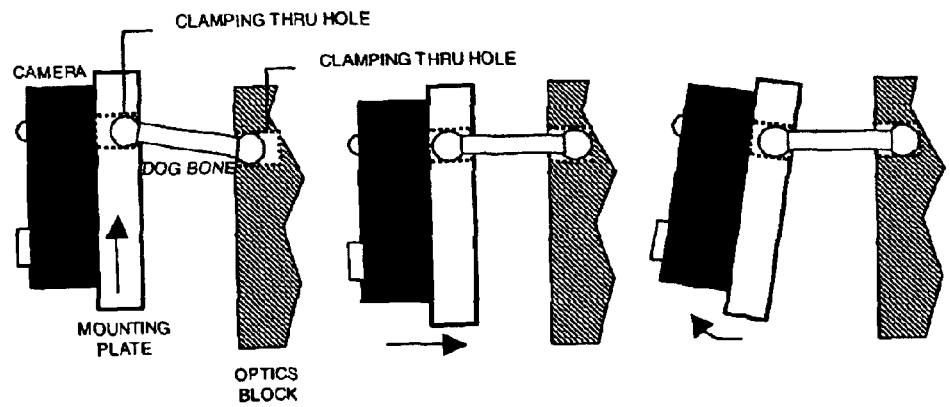
FIG. 20a  FIG. 20b  FIG. 20c
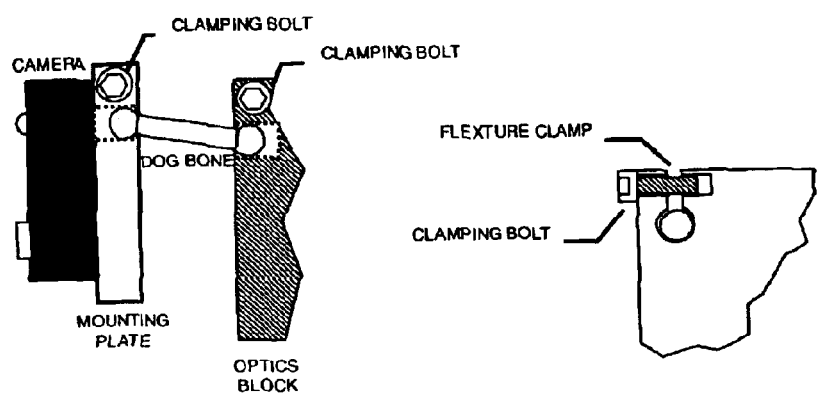
FIG. 21a  FIG. 21b

FIG. 24b
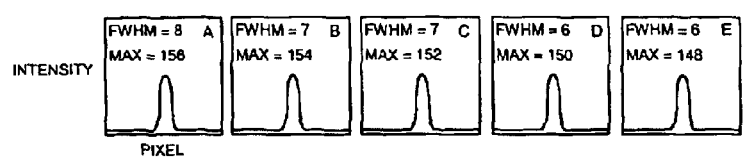
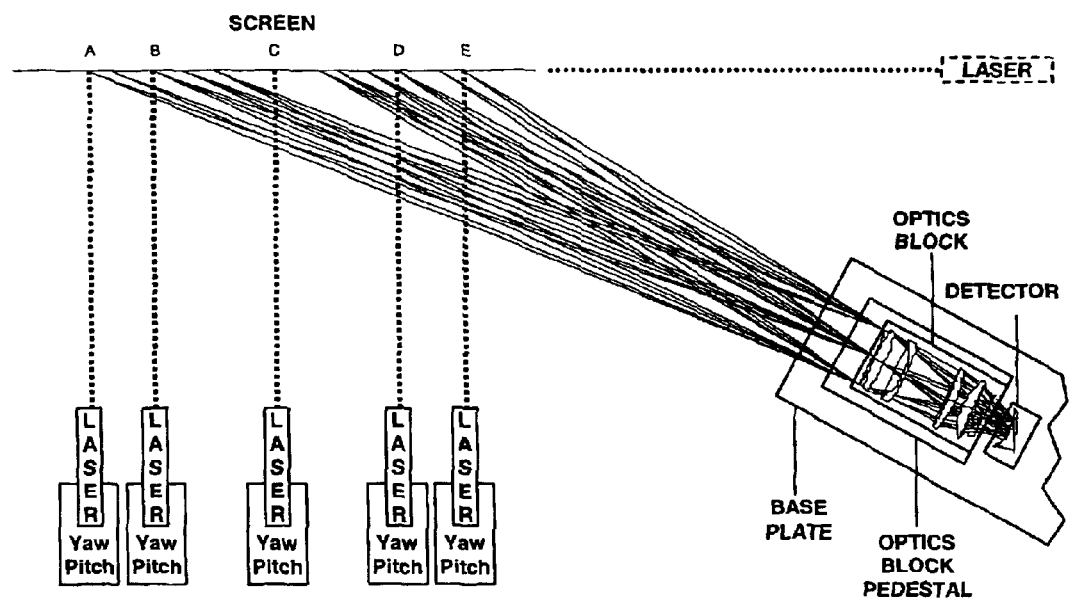
FIG. 24a

HIGH PRECISION OPTICAL IMAGING SYSTEMS AND RELATED SYSTEMS

This application claims priority from provisional application 60/421,719, filed Oct. 28, 2002.

FIELD OF THE INVENTION

The present invention relates to the field of non-contact laser scanner profilometers and systems for mounting various components (e.g. within a profilometer) capable of high-precision alignment of the various components.

BACKGROUND OF THE INVENTION

The present invention describes the design and construction of high-precision off-axis optical imaging systems. The present invention also describes the design and construction of high-precision mounting structures for rigidly holding optical elements in an optical imaging system. The present invention further describes both a mechanism for highly stable mounting and a technique for high precision focusing of a detector in a complex optical setup. The present invention even further describes both tooling and a technique used for focusing high precision optical imaging systems. The theory and use of at least these concepts are introduced by examining how these concepts aid the construction and use of a non-contact laser scanning system. A body of useful information for this work is described in U.S. Pat. No. 6,441,908, issued to Johnston et al.

These and other advantages of the present invention will become more fully apparent from the detailed description of the invention hereinbelow.

SUMMARY OF THE INVENTION

The present invention is directed to a system for mounting capable of high-precision alignment in six axes of a first element relative to a second element, the system comprising: at least one post having a first end and a second end, wherein the first end has a first end diameter, and wherein the second end has a second end diameter; a first element having the first end affixed thereto; and a second element having at least one hole, wherein the hole has a hole diameter which is greater than the second end diameter such that the second end is positioned within the hole, wherein a gap is provided within the hole, wherein the gap is between the second end and the second element, wherein a material is provided within the gap that serves to affix the second end to the second element.

The present invention is also directed to a system for mounting capable of high-precision alignment in six axes of a first element relative to a second element, the system comprising: a first hollow post having a first end and a second end, wherein the first end has a first end diameter, and wherein the second end has a second end diameter; a second hollow post having a first end and a second end, wherein the first end has a first end diameter, and wherein the second end has a second end diameter; a first element having the first end of the first hollow post affixed thereto; and a second element having the first end of the second hollow post affixed thereto, wherein the second end diameter of the first hollow post is greater than the second end diameter of the second hollow post such that the second hollow post is positioned at least partly within the first hollow post, wherein a gap is provided between the first hollow post and the second hollow post, wherein a material is provided within the gap that serves to affix the first hollow post to the second hollow post.

The present invention is further directed to a system for mounting capable of high-precision alignment in six axes of a first element relative to a second element, the system comprising: at least one post having a first end and a second end, wherein the first end has a first end diameter, wherein the second end is at least partly spherical having a second end diameter, wherein the post has a shaft between the first end and the second end, and wherein the shaft has a shaft diameter which is less than the second end diameter; a first element having the first end affixed thereto; and a second element having at least one hole, wherein the hole has a hole diameter which is greater than the shaft diameter, wherein the second end is positioned within the hole, and wherein the second end is clamped within the hole with a clamping element.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

FIGS. 5a and 5b are plots illustrating field curvature, distortion and vignetting showing performance of the preceding preferred embodiment of the optical system configuration.

FIG. 6 is a spot diagram for the preceding preferred embodiment of the optical system configuration.

FIGS. 8a and 8b respectively illustrate isometric and side views showing an optical path as well as mounting position for a secondary detector installed at the focus of the plate beam splitter.

FIG. 9 illustrates a top view of an optical mounting structure.

FIGS. 16a, 16b, and 16c illustrate a camera/mounting plate assembly shown moving relative to the post which is affixed to the optics block.

FIG. 17 illustrates an injector used to fill an oversized hole with glue, permanently locking in alignment and rigidly affixing the camera/mounting plate assembly to the post/optics block.

FIGS. 18a and 18b illustrate a retaining bolt and hollow shaft together forming a mounting post that can be removed from the optics block after the mounting plate is adhesive clamped to the post.

FIG. 19a illustrates an injector used to fill an oversized hole with glue, locking in alignment and rigidly affixing the camera/mounting plate assembly to the tube/optics block. FIG. 19b illustrates a nested tube configuration.

FIGS. 20a, 20b, and 20c illustrate a dog bone shaped mounting post that connects the camera/mounting plate assembly to the optics block allowing complete freedom of motion in 6 axes.

FIGS. 21a and 21b illustrate a dog bone that connects the camera/mounting plate assembly to the optics block using a clamping bolt/flexure clamp configuration.

FIGS. 24a and 24b respectively illustrate a focus table configuration showing a laser illuminating a screen set at an object location and a frame grabber showing images taken from a camera.

DETAILED DESCRIPTION OF THE PREFERRED EMBODIMENTS

Figure 1:
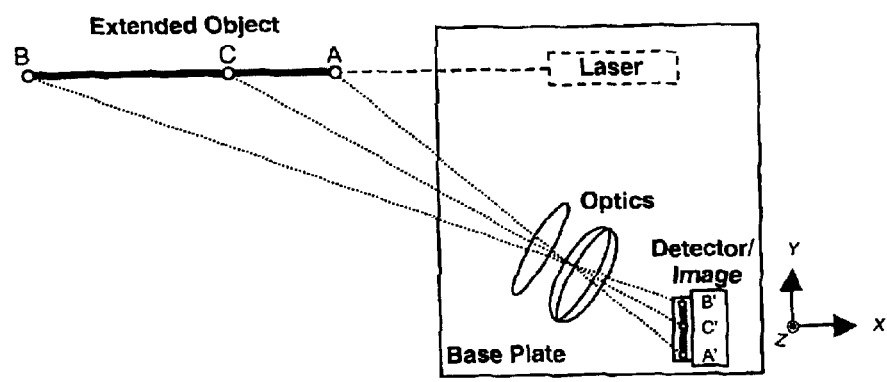
FIG. 1 illustrates a schematic top view of an optical system in the Scheimpflug configuration where the laser, optics, and camera are all affixed to the same base plate.

Reference will now be made to the drawings wherein like structures are provided with like reference designations. It will be understood that the drawings included herewith only provide diagrammatic representations of the presently preferred structures of the present invention and that structures falling within the scope of the present invention may include structures different than those shown in the drawings.

The inventions in this disclosure are intended for, but not limited to, use with a non-contact laser scanner profilometer, similar to the systems discussed in U.S. Pat. No. 6,441,908. Examples of implementations and identification of preferred techniques will be made as they relate to laser scanning profilometry applications.

We have developed a precision optical measurement instrument configured as shown schematically in FIG. 1. The extent of the object is defined by the locus of points along a laser beam extending from point A to point B. The detector and optics assembly are aligned in a Scheimpflug configuration where both the object and the image are tilted relative to the optical axis. When the surface of a physical object intersects the laser beam, a single point of light, for example point C, is imaged onto the detector, e.g. at point C'. Signal processing is done on the image to find the exact location in image space of the point. The location of the surface point in object space can then be determined using similar triangles. The linear array detector preferably has only a 10 μm height and requires a highly precise alignment with the optics and the object to make sure that C' always lands on the detector. Further, the imaging quality of the optical system is crucial for determining the location of C', so the accuracy of the system requires that a precise focus be maintained across the entire image.

Desired Specifications: The design of the optical system is heavily constrained by performance and physical factors. The measurement instrument is designed to resolve the position of a point to better than about 1:12,000 along the length of the extended object. The ultimate performance of the measurement instrument depends mostly on the optical characteristics designed and constructed into the imaging system. The instrument also needs to be designed to fit into a robust, compact case for commercial deployment. These physical concerns also place many constraints on the design and construction of the imaging system. A listing of the specifications desired from the design are as follows:

Scheimpflug Configuration: As depicted in FIG. 1, the system is intended for extreme off-axis imaging. To keep the size of the base plate down, the angle between the object and the optical axis should preferably be less than about 30°.

Stand Off: The distance along the direction of the extended object from the nearest point that can be imaged (point A in FIG. 1) to the front edge of the instrument case should preferably be greater than about 6" (152 mm). Accounting for the desired path length in the case, the distance along the optical axis from the object (point C) to the first optical surface should preferably exceed about 520 mm.

Total Path Length: To allow the optical system to fit into a preferably compact case, the total distance along the optical path from the object (point C) to the surface of the detector should preferably be less than or equal to about 670 mm.

Object Size: The distance along the object that can be imaged should preferably be at least about 12" (305 mm).

Magnification: The magnification is determined by the choice of detectors. In this preferred case, the use of an approximately 20 mm long detector imparts the need for substantially 15.25:1 magnification.

Large Aperture: To allow the system to gather data from the widest possible range of surface finishes, the system aperture needs to be large enough so the solid angle for the axial object point (point C) has a solid angle of at least about 0.0035. This is equivalent to approximately a 35 mm diameter at approximately a 520 mm stand off distance.

Co-Axial Beam Splitter: In addition to a detector for acquiring an image of an illuminated spot on the surface, the system needs a second detector to acquire radiometry data for use in the Automatic Gain Control (AGC) system used to adjust the illumination (laser) intensity. This detector must have an optical path substantially coaxial with the imaging path. To accommodate this need, a beam splitter must be included in the optical path, preferably in the space between the last lens and the detector to reduce the need for redundant optics.

Maximum Lateral Blur: The image of a hypothetical point anywhere along the extended object should preferably have a RMS diameter along the axis of the detector of less than about 50 mm diameter at the detector surface. The implication of this specification is that all the aberrations in the system should be very tightly controlled.

Flat Field: The image of a linear or planar object in a Scheimpflug optical system can only be approximated as a line or plane for image locations very close to the optical axis. In practice, the image for a system like that shown in FIG. 1 will have significant curvature. The optics must control this curvature so the image that lands on the linear array detector does not exceed the maximum blur specification.

Distortion Allowed: Fortunately, the use of image processing allows the presence of significant distortion without degrading the performance of the system.

Monochromatic: This system is designed for, but not limited to, use at one wavelength in the range of about 630 nm to about 680 nm, preferably about 670 nm.

U.S. Pat. No. 6,441,908 provides an explanation of other aspects of a measurement instrument and provides helpful background information about optical systems that may be useful in describing the present invention.

There are many existing optical imaging systems to be found. Sadly, none exist that could serve to meet even a portion of the desired specifications for the measurement instrument. However, one particular lens configuration that bears some relation to the present invention is the Cooke Triplet. It has been studied extensively in literature because it provides excellent imaging performance and is a very flexible design. Lens triplets in this configuration provide enough variables to simultaneously correct many of the aberrations that can affect optical imaging systems. Therefore, many optical designers use this configuration as a starting point when developing a lens configuration to address particular specifications. As such, there have been many derivations of the triplet lens configuration. One particular design is specified in U.S. Pat. No. 1,540,752.

Figures 2A, 2B:
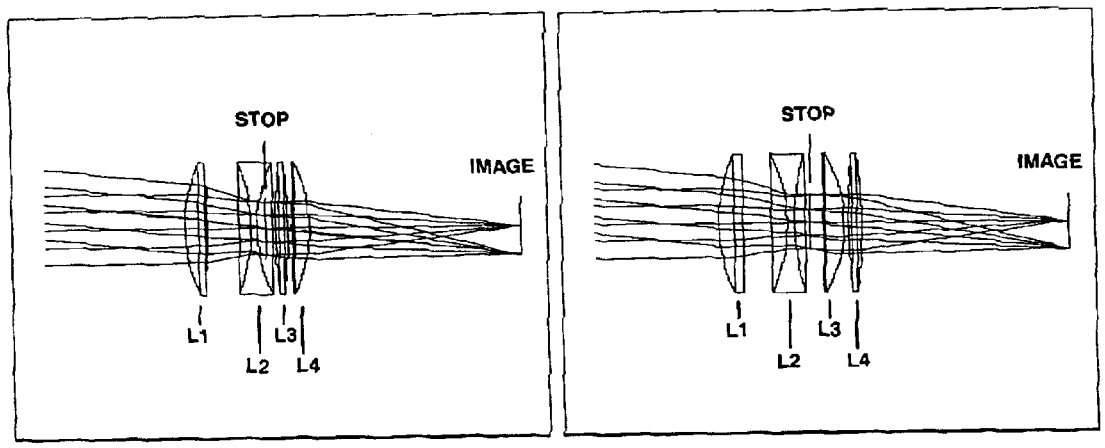
FIGS. 2a and 2b illustrate two lens configurations specified in U.S. Pat. No. 1,540,752 resulting from splitting the last element in a typical triplet lens configuration, in accordance with the prior art.

The Cooke Triplet is characterized by a first converging lens (L1) that is plano-convex with the curved surface facing the object. The second element (L2) is a symmetric bi-concave diverging lens. The third element (L3) is a plano-convex with the curved surface facing the image. U.S. Pat. No. 1,540,752 modifies the original triplet by splitting L3 into two lenses and "bending" the lenses to minimize aberrations. Lens bending is a standard engineering practice of modifying the curvature of the surfaces so the lens maintains the original optical power but the imaging aberration contributions from that lens are modified. FIGS. 2a and 2b depict the two derivations of the original triplet lens configuration that are specified in U.S. Pat. No. 1,540,752.

Ignoring specific diameters and curvatures called out in U.S. Pat. No. 1,540,752, the claimed and taught characteristics of the lens configurations are:

Four lenses

A positive powered first lens (L1)

A negative powered second lens (L2)

The rays between L2 and L3 are diverging

An aperture between the second lens and third lens

Positive powered third (L3) and fourth lenses (L4)

Either L3 or L4 has a focal length less than or equal to twice the focal length of the combined system (L1 through L4)

The other of the pair of L3 and L4 has a focal length less than the focal length of the combined system One of the pair L3 and L4 has its weaker (larger) curvature facing the aperture.

Portions of the present invention have some degree of physical similarity to the configurations in FIGS. 2a and 2b but the design of the present invention differs greatly in many important characteristics. The following sections give a detailed description of the present invention and clearly specifies how the present invention differs from the configurations in FIGS. 2a and 2b.

High Precision Off-axis Optical Imaging Systems

A Preferred Optical System: The concepts in this disclosure are intended for, but not limited to, precision optical imaging systems for use in a non-contact laser scanner profilometer, such as in U.S. Pat. No. 6,441,908. Examples of the implementations and identification of the preferred techniques will be made as they relate to laser scanning profilometry applications.

Figure 3:
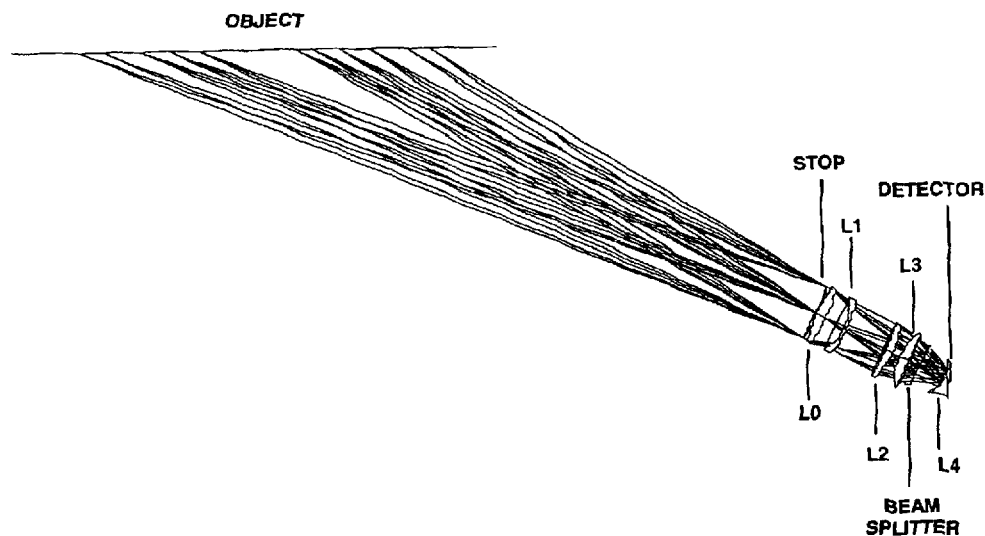
FIG. 3 illustrates a top view of an entire optical system, in accordance with a preferred embodiment of the present invention.
Figures 4A, 4B:
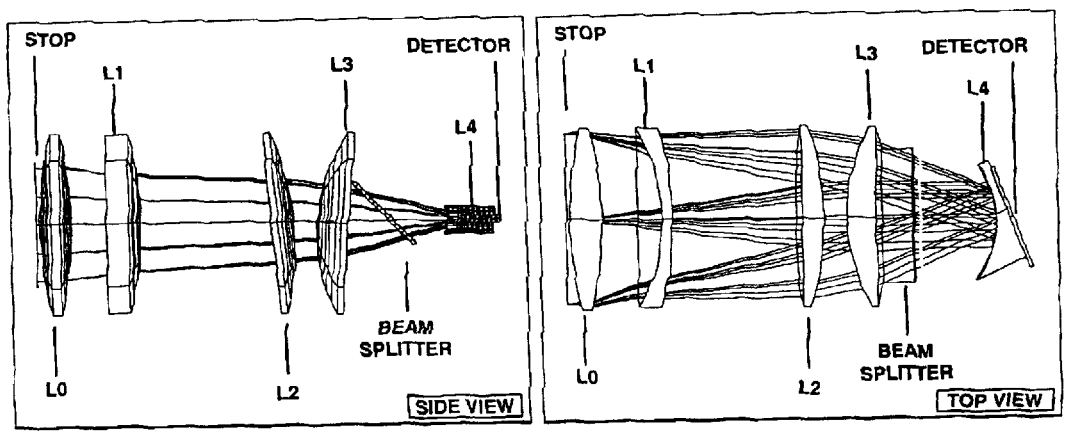
FIGS. 4a and 4b respectively illustrate close up side and top views of an optical configuration, in accordance with a preferred embodiment of the present invention. The optical elements in the configuration will be supported by a mounting configuration, in accordance with a preferred embodiment of the present invention.

Features Of This Preferred Optical System: An optical system configuration has been designed that simultaneously satisfies all or most of the desired specifications. A preferred embodiment of the optical system that meets the desired specifications is shown in FIG. 3. FIGS. 4a and 4b respectively contain close up side and top view diagrams of the optical elements in the specific preferred embodiment depicted in FIG. 3. Examination of the specific characteristics of this preferred embodiment serve to explain and demonstrate the general characteristics of the particular optical system:

The preferred embodiment contains Five Lenses and a Beam Splitter. All lenses are single elements with spherical surfaces.

The optical axis is at an Angle of about 26.5° relative to the Extended Object. The resulting tilt of the detector is about 21.4° relative to the optical axis.

The Stand Off=about 534 mm from extended object to aperture along the optical axis.

Total Length=about 670 mm from extended object to detector along the optical axis.

An Elliptical Aperture of approximately 35 mm×48 mm placed between the object and the first lens yields a Solid Angle of about 0.0046. With the aperture in the front of the lens system, solid angle is calculated by the ratio of the aperture area to the square of the stand off distance. With the large aperture, the depth of focus is minimized, helping the instruments immunity to spurious light.

The First Lens (L0) is a symmetric bi-convex lens with positive power.

The Second Lens (L1) is a negative power meniscus lens that is bent to provide relieve from spherical aberrations.

The Third Lens (L2) is a positive powered plano-convex lens with its flat face oriented towards the Object.

The Forth Lens (L3) is a positive powered meniscus lens that is very close to piano-convex oriented so its weak curvature face is on the image side.

The Fifth Lens (L4) is a Field Flattener deployed directly in contact with the front surface of the detector window.

The field flattener L4 is Off Center with respect to the optical axis to provide better correction of field curvature.

The Plate Beam Splitter oriented at about 45° is located in the specifically provided space between L3 and L4. The beam splitter allows a portion of the light to be focused at 90° to the optical axis to a location below the optical axis for use with a separate detector. This redundant detector has many uses including, but not limited to, an AGC system.

As shown in FIG. 4a, to Correct for the Astigmatism caused by the tilted beam splitter plate, lenses L2 and L3 are Tipped at +/− about 5° relative to the axis of rotation of the beam splitter.

To reduce effects of primary aberrations, the Object Is Off Center with respect to the optical axis. This allows the angle between AC to be substantially equal to the angle between CB in FIG. 1.

Preferred Embodiment Specifications: The specifications for the preceding preferred embodiment of an optical system of the present invention are listed in Table 1 through Table 3. Note that although each lens is surrounded by coordinate break surfaces to facilitate tilting and translating individual elements, L0 and L1 are aligned with the optical axis. Therefore, surfaces 4, 7, 9 and 12 are empty placeholders. Also, note that the combination of surfaces 14, 16 and 19 serves to place the center of tilt for L2 near the center of the lens without deflecting the optical axis.

Definitions: Sign Convention Follow Zemax standards (ZEMAX Optical Design Program, Focus Software, Inc. Box 18228, Tucson Ariz. 85731)
Units All dimensions are in mm
Wavelength 670 nm
BK7 Standard Glass, Refractive Index at 670 nm=1.51390540
Order Coordinate breaks Decenter first, then Tilt

TABLE 1

Specifications of the physical parameters of a preferred embodiment of an optical system of the present invention.

| Surf | Type | Comment | Radius | Thickness | Glass | Diameter |
|---|---|---|---|---|---|---|
| OBJ | STANDARD | | Infinity | 0 | | 310 |
| 1 | BREAK | TILT X AXIS, OBJ | — | 0 | | — |
| 2 | BREAK | SHIFT ORIGIN | — | 539.487 | | — |
| STO | STANDARD | STOP | Infinity | 1 | | 47.8 |
| 4 | BREAK | TWIST L0 | — | 0 | | — |
| 5 | STANDARD | L0.1 | 103.7883 | 9.3 | BK7 | 50.8 |
| 6 | STANDARD | L0.2 | −103.7883 | 1 | | 50.8 |
| 7 | BREAK | UNTWIST L0 | — | 0 | | — |
| 8 | BREAK | SPACER | Infinity | 16.59335 | | 50.8 |
| 9 | BREAK | TWIST L1 | — | 0 | | — |
| 10 | STANDARD | L1.1 | −47.84002 | 3 | BK7 | 50.8 |
| 11 | STANDARD | L1.2 | −90.0009 | 0 | | 50.8 |
| 12 | BREAK | UNTWIST L1 | — | 1 | | — |
| 13 | BREAK | SPACER | Infinity | 37.1361 | | 50.8 |
| 14 | BREAK | | — | 3 | | — |
| 15 | BREAK | TWIST L2 | — | 0 | | — |
| 16 | BREAK | CENTER L2 TIP | — | −3 | | — |
| 17 | STANDARD | L2.1 | Infinity | 6.3 | BK7 | 50.8 |
| 18 | STANDARD | L2.2 | −77.26184 | 0 | | 50.8 |
| 19 | BREAK | STEP BACK | — | −3.3 | | — |
| 20 | BREAK | UNTWIST L2 | — | 0 | | — |
| 21 | BREAK | SPACER | Infinity | 10.13206 | | 50.8 |
| 22 | BREAK | TWIST L3 | — | 0 | | — |
| 23 | STANDARD | L3.1 | 47.83087 | 8.7 | BK7 | 50.8 |
| 24 | STANDARD | L3.2 | 667.5567 | 0 | | 50.8 |
| 25 | BREAK | UNTWIST L3 | — | 1 | | — |
| 26 | BREAK | EXIT APERTURE | Infinity | 12 | | 46.58792 |
| 27 | BREAK | TIP BS | — | 0 | | — |
| 28 | STANDARD | BS1.1 | Infinity | 1 | BK7 | 39.10131 |
| 29 | STANDARD | BS1.2 | Infinity | 0 | | 38.46128 |
| 30 | BREAK | UNTIP BS | — | 22.65152 | | — |
| 31 | BREAK | TILT DET. | — | 0 | | — |
| 32 | BREAK | DECENTER FLAT | — | 0 | | — |
| 33 | STANDARD | L4.1 | −25.93966 | 2 | BK7 | 47 |
| 34 | STANDARD | L4.2 | Infinity | 0 | | 47 |
| 35 | BREAK | DECENTER DET | — | 0 | | — |
| 36 | STANDARD | WINDOW | Infinity | 1 | BK7 | 21.14077 |
| IMA | STANDARD | DETECTOR | Infinity | | | 20.17334 |

Summary Descriptions: The shaded regions in Table 1 serve to group the entries that affect the specification of individual lenses. Table 2 gives summary descriptions of each element and Table 3 gives details that modify the extent or position of each surface.

TABLE 2

Summary descriptions of elements in the preferred embodiment of the optical system described in Table 1.

| | |
|---|---|
| OBJ | Object, Surface 0 |
| STO | Stop, Surface 3 |
| BREAK | Surface used to change coordinate system or add space, no curvature, refractive index or diameter are specified |
| STANDARD | Surface that refracts or rays or acts like an aperture |
| L0 | Biconvex, focal length = 101.6 mm, Surfaces 5, 6 |
| L1 | Meniscus, focal length = −200 mm, Surfaces 10, 11 |
| L2 | Planar Convex, focal length = 150 mm, Surfaces 17, 18 |
| L3 | Meniscus, focal length = 100 mm, Surfaces 23, 24 |

TABLE 2-continued

Summary descriptions of elements in the preferred
embodiment of the optical system described in Table 1.

| | |
|---|---|
| BS | Plate beam splitter, Surfaces 28, 29 |
| L4 | Planar Concave, focal length = −50, Surface 33, 34 |
| WINDOW | Front window on camera, Surface 36 |
| IMA | Image location, Surface 37 |
| Ftotal | Total focal length of system = 60.06 mm | regards half the field of view. Although it does help predict the imaging performance of the system, it will not necessarily predict the actual performance of an off-axis system.

To confirm the performance of the actual system, the plot in FIG. 6 shows a spot diagram for points spanning the entire extended object. A spot diagram utilizes actual traced rays and accurately predicts performance for an off-axis system. FIG. 6 indicates that a tight focus of less than about 45 $\mu$m RMS blur diameter has been obtained across the field of view. In this aspect and all others, the design and performance of the preceding preferred embodiment of the optical

TABLE 3

Details about the elements in the preferred embodiment
of the optical system described in Table 1.

| SURFACE DATA DETAIL | COMMENT | Aperture | X half width | Y half width | Decenter X | Decenter Y | Tilt about X | Tilt about Y |
|---|---|---|---|---|---|---|---|---|
| Surface OBJ | STANDARD | Rectangle | 5 | 215 | | | | |
| Surface 1 | COORDBRK TILT X AXIS, OBJ | | | | | | −63.5 | |
| Surface 2 | COORDBRK SHIFT ORIGIN | | | | | 17.782839 | | |
| Surface STO | STANDARD STOP | Elliptical | 17.5 | 24 | | | | |
| Surface 4 | COORDBRK TWIST L0 | | | | | | | |
| Surface 5 | STANDARD L0.1 | Circular | 25.4 | 25.4 | | | | |
| Surface 6 | STANDARD L0.2 | Circular | 25.4 | 25.4 | | | | |
| Surface 7 | COORDBRK UNTWIST L0 | | | | | | | |
| Surface 8 | COORDBRK SPACER | | | | | | | |
| Surface 9 | COORDBRK TWIST L1 | | | | | | | |
| Surface 10 | STANDARD L1.1 | Circular | 25.4 | 25.4 | | | | |
| Surface 11 | STANDARD L1.2 | Circular | 25.4 | 25.4 | | | | |
| Surface 12 | COORDBRK UNTWIST L1 | | | | | | | |
| Surface 13 | COORDBRK SPACER | | | | | | | |
| Surface 14 | COORDBRK | | | | | | | |
| Surface 15 | COORDBRK TWIST L2 | | | | | | | 5 |
| Surface 16 | COORDBRK CENTER L2 TIP | | | | | | | |
| Surface 17 | STANDARD L2.1 | Circular | 25.4 | 25.4 | | | | |
| Surface 18 | STANDARD L2.2 | Circular | 25.4 | 25.4 | | | | |
| Surface 19 | COORDBRK STEP BACK | | | | | | | |
| Surface 20 | COORDBRK UNTWIST L2 | | | | | | | −5 |
| Surface 21 | COORDBRK SPACER | | | | | | | |
| Surface 22 | COORDBRK TWIST L3 | | | | | | | −5 |
| Surface 23 | STANDARD L3.1 | Circular | 25.4 | 25.4 | | | | |
| Surface 24 | STANDARD L3.2 | Circular | 25.4 | 25.4 | | | | |
| Surface 25 | COORDBRK UNTWIST L3 | | | | | | | 5 |
| Surface 26 | COORDBRK EXIT APERTURE | | | | | | | |
| Surface 27 | COORDBRK TIP BS | | | | | | | 45 |
| Surface 28 | STANDARD BS1.1 | Rectangle | 12.5 | 18.5 | 3.5 | | | |
| Surface 29 | STANDARD BS1.2 | Rectangle | 12.5 | 18.5 | 3.5 | | | |
| Surface 30 | COORDBRK UNTIP BS | | | | | | | −45 |
| Surface 31 | COORDBRK TILT DET. | | | | | | −21.37359 | |
| Surface 32 | COORDBRK DECENTER FLAT | | | | 0.16340908 | 8.6921964 | | |
| Surface 33 | STANDARD L4.1 | Rectangle | 4 | 14.75 | | −7.75 | | |
| Surface 34 | STANDARD L4.2 | Rectangle | 4 | 14.75 | | −7.75 | | |
| Surface 35 | COORDBRK DECENTER DET | | | | 0.10444608 | −10.064508 | | |
| Surface 36 | STANDARD WINDOW | Rectangle | 1 | 15 | | | | |
| Surface IMA | STANDARD DETECTOR | Rectangle | 1 | 15 | | | | |

Performance: When considering that the preceding preferred embodiment has about 15.25:1 magnification, is extremely off-axis, and has an almost 2" clear aperture, the imaging performance of the system is spectacular. FIG. 5a shows that the image surface is substantially flat across the entire image space and the astigmatic focus separation is below 50 um. FIG. 5a also shows that the distortion in the system is significant, which was an expected consequence in the design of this off-axis system. Fortunately, the presence of distortion will not adversely affect the utility of the design. FIG. 5b shows that the system demonstrates very low vignetting, even with a wide-open aperture. When all surfaces are preferably coated with a low loss AR coating, there are no appreciable losses dependent on the objects location in the field of view. Note that FIG. 5a is valid only for paraxial rays and apparently assumes symmetry so it only system configuration meets or exceeds the desired specifications set forth previously.

Design Process and Concepts: Modern optical engineers enjoy the use of sophisticated CAD tools that allow the design to be iterative optimized, sometime departing far from the initial design form. However, the computer cannot perform the crucial tasks of specifying the starting configuration, defining the allowed variables or developing the specifications (or merit function) used to guide the optimization routines. In addition to these tasks, the engineer must guide the optimization process and make appropriate decisions to guide the solution to an acceptable form that is physically realizable. For others to produce duplicate or related designs that follow a new design form, the concepts behind the starting point, the constraints utilized and the strategy for the optimization process must be communicated. The skill with which the engineer uses tools such as CAD will remain a variable that affects the success of the design of any optical configuration.

In the case of the present invention, the new form has an easily recognizable origin. An explanation of the design process for the preferred embodiment shown in FIG. 3 will aide in the reproduction of this new design form. Starting with a Cooke Triplet, the basic system was defined in CAD. Initial conditions were set so that the approximate standoff, off-axis angle and total system length were met. The initial powers of the triplet were adjusted so the system was roughly focused and had approximately the correct magnification. Special care was taken when defining the merit function to ensure the minimum standoff was maintained, the elements did not run into each other, the final magnification and Field of View (FOV) were correct and equal angles for the extreme rays in object space were maintained. Finally, limits were placed on the curvature of the lenses so the CAD would not select unrealizable solutions.

While allowing the curvature of the lens surfaces to vary as well as the tilt and location of the image plane, it was noted that the imaging performance of any systems obtainable with the defined variables was not sufficient to meet the desired specifications. Analysis of the Siedel coefficients indicated that L2 (FIGS. 4a and 4b) was causing a majority of the aberrations in the design, so the decision was made to split L2 into two elements, L2 and L3. A close observation of the top view in FIG. 4b shows that the rays are almost parallel. Note that a Ramsden eyepiece has a certain similarity to the orientation of L2 and L3, e.g. a pair of plano-convex lenses with curved surfaces facing each other. Since an eyepiece serves to take an object plane (the reticle location) and create an infinite conjugate image, essentially collimating the light, it was reasoned a backwards eyepiece design should aid in focusing the collimated light to an image plane.

Field curvature was a continuing problem, so an aggressive field flattener L4 was added to the surface of the detector by specifying a lens with a very tight radius of curvature. The decision to apply L4 directly to the detector was motivated by the desire to keep an open space between L3 and L4 for the addition of the beam splitter. The rotation of L4 and the detector were constrained together to simplify the construction process of locating and mounting L4 relative to the detector. However, L4 was allowed to move laterally across the face of the detector as another degree of freedom to optimize the flattening of the image surface.

During optimization, it was noted that the shape of Lens L0 was approaching a symmetric bi-convex lens form. Its shape was therefore constrained to be symmetrical to simplify the manufacturing process. Regardless of its final shape, in this optical configuration, L0 imparts a larger change on the propagation angles of the rays than any other element in the system. It is not surprising that according to analysis of the Seidel coefficients, L0 also imparts large amounts of the first 5 primary aberrations: Spherical, Coma, Astigmatism, Field Curvature and Distortion. Fortunately, we are not concerned about optimizing Distortion (and we do not have to deal with chromatic aberrations). Therefore, the rest of the optical system only needs to balance each other while correcting the remaining four aberration contributions of L0.

The original symmetric bi-concave form of L1 (L2 in FIGS. 2a and 2b) was allowed to bend to the meniscus form shown in FIGS. 4a and 4b. The lens retains its negative power but the new form almost perfectly compensates for the Coma from L0 while overcorrecting for Spherical Aberrations by about 50%. Additionally, L1 also removes about 50% of the Field curvature from L0.

L2 performs the role of gently starting the rays converging, so L3 doesn't generate too many aberrations itself. L2 also undoes some of the over-correction provided by L1. L3 compensates for the majority of the remaining astigmatism from L0 while focusing the rays onto the detector. The distribution of power between L2 and L3 avoids a significant aberration penalty compared to keeping that power in a single element. The slight bending of L3 to its meniscus form was found to significantly reduce the amount of Comas and Spherical Aberrations and thereby significantly reduce the RMS blur in the image.

Figure 7:
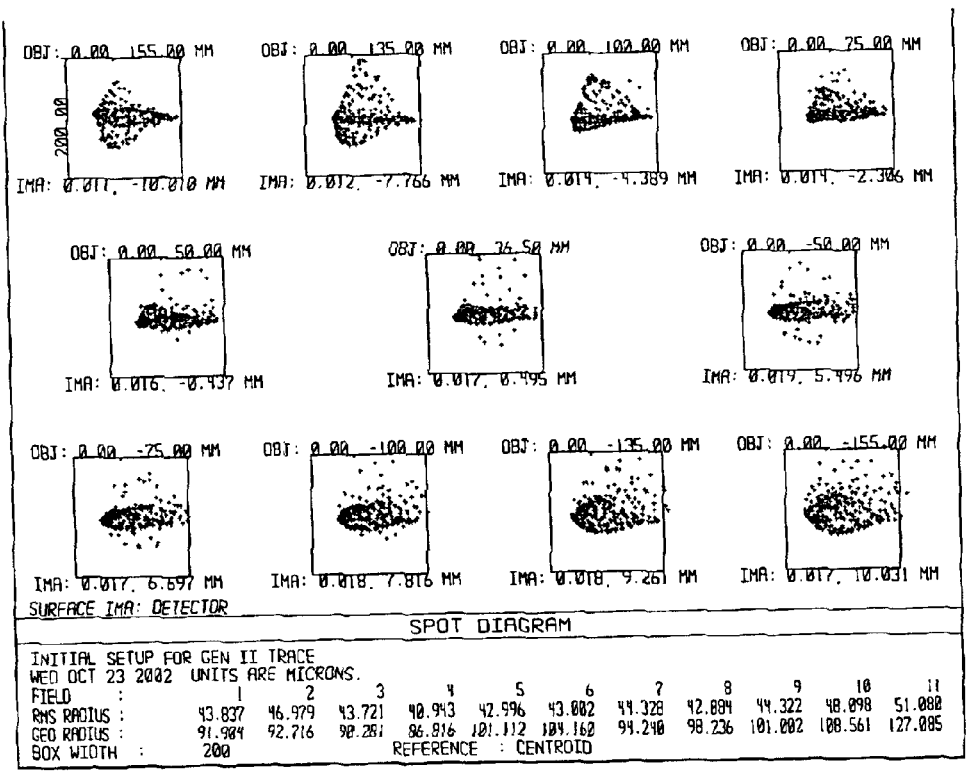
FIG. 7 is a spot diagram after insertion of a plate beam splitter and before correction.

When the design optimization of the five lens configuration was completed, the system configuration was very close to that shown in FIGS. 4a and 4b with just slightly superior performance as measured by spot size in a spot diagram. A consistent effort had been made throughout the optimization to allow enough space between the L3 and L4 to allow the inclusion of a glass plate beam splitter. An approximately 1 mm thick beam splitter at about 45° was then included in the model. It is well known that a tipped glass plate in a converging beam will cause astigmatism. FIG. 7 depicts the best possible focus achieved when a plate beam splitter was inserted into the system and only the lens spacing, detector tilt and position, and L4 position were available for focusing. Both the RMS blur and the geometrical (total) blur were more than twice the original performance. To compensate for the presence of the beam splitter, offsetting approximately 5° tilts were added to lenses L2 and L3 in the specific orientation shown in FIGS. 4a and 4b. Although the literature states that astigmatism from a tipped plate can be corrected by tilting one of the spherical elements in the system, the general advice is to twist an element around an axis perpendicular to the axis of rotation of the plate. In the preceding preferred embodiment design, it was found that no combination single lens or dual lens twisting could reduce the spot sizes seen in FIG. 7 by more than 10%. Similarly, tipping any single element in the system could not reduce the spot sizes by more than 10%. However, when offsetting tilts in L2 and L3 were introduced, substantially the same spot sizes in FIG. 6 were obtained, which are better than half those in FIG. 7 and within 10% of the values before the introduction of the plate beam splitter. Clearly, the conventional wisdom and theory do not apply to this optical configuration and the introduction of offsetting tipped elements constitutes a unique contribution.

AGC Configuration: It was previously stated that an AGC detector could be installed at the orthogonal image location formed by the beam splitter. FIGS. 8a and 8b show a preferred configuration for locating the AGC detector. Up to the beam splitter, the optical layout is substantially identical to the preceding embodiment. Table 4 and Table 5 give the specifications and details for the construction of the portion of the system in which the AGC leg differs from the preceding embodiment specified in Table 1 and Table 3. A full specification for the AGC leg can be obtained by replacing the end of Table 1 with Table 4 and the end of Table 3 with Table 5, starting at surface 27 for both.

TABLE 4

Specifications of the physical parameters of the AGC
leg as it differs from the preceding embodiment

| Surf | Type | Comment | Radius | Thickness | Glass | Diameter |
|---|---|---|---|---|---|---|
| 27 | BREAK | TIP BS | — | 0 | | — |
| 28 | BREAK | | — | 0 | | — |
| 29 | STANDARD | BS1.1 | Infinity | 0 | MIR | 39.08268 |
| 30 | BREAK | | — | 0 | | — |
| 31 | BREAK | UNTIP BS | — | −22.8814 | | — |
| 32 | BREAK | TILT DET. | — | 0 | | — |
| 33 | BREAK | DECENTER FLAT | — | 0 | | — |
| 34 | STANDARD | L4.1 | 25.93966 | −2 | BK7 | 47 |
| 35 | STANDARD | L4.2 | Infinity | 0 | | 47 |
| 36 | BREAK | DECENTER DET | — | 0 | | — |
| 37 | STANDARD | WINDOW | Infinity | −1 | BK7 | 21.2756 |
| IMA | STANDARD | DETECTOR | Infinity | | | 20.31443 |

TABLE 5

Details about the elements in the AGC leg as
it differs from the preceding embodiment.

| SURFACE DATA DETAIL | COMMENT | Aperture | X half width | Y half width | Decenter X | Decenter Y | Tilt about X | Tilt about Y |
|---|---|---|---|---|---|---|---|---|
| Surface 27 | COORDBRK TIP BS | | | | | | | |
| Surface 28 | COORDBRK | | | | | | | 45 |
| Surface 29 | STANDARD BS1.1 | Rectangle | 12.5 | 18.5 | 3.5 | | | |
| Surface 30 | COORDBRK | | | | | | | 45 |
| Surface 31 | COORDBRK UNTIP BS | | | | | | | |
| Surface 32 | COORDBRK TILT DET. | | | | | | 21.368638 | |
| Surface 33 | COORDBRK DECENTER FLAT | | | | 0.3947847 | 8.6335589 | | |
| Surface 34 | STANDARD | Rectangle | 2.5 | 14.75 | | | −7.5 | |
| Surface 35 | STANDARD | Rectangle | 2.5 | 14.75 | | | −7.5 | |
| Surface 36 | COORDBRK DECENTER DET | | | | 0.2472381 | −9.9981907 | | |
| Surface 37 | STANDARD WINDOW | Rectangle | 1 | 15 | | | | |
| Surface IMA | STANDARD DETECTOR | Rectangle | 1 | 15 | | | | |

Note that "MIR" in Table 4 refers to the reflective or mirror first surface of the beam splitter. An approximately 25% reflection coefficient, first surface BK7 plate beam splitter, approximately 1 mm thick and coated with an AR coating on the backside specifies a preferred plate beam splitter. Note also that an identical L4 is specified for use in the ACG leg, this was done specifically to address manufacturing issues. However, for optimal imaging performance, L4 is preferably mounted in a slightly different orientation relative to the detector in the AGC leg. Since L2 and L3 are tipped to correct the images formed through the beam splitter plate, the AGC image is over corrected and results similar to those in FIG. 7 are obtained. Allowing L4 to be repositioned mitigates the astigmatic defocus slightly. Finally, the preferred AGC detector is an approximately 0.5 mm×20 mm long PID silicon photo-detector, although other detectors could also be effective.

As was stated previously, a direct comparison between the optical system of the present invention and that in U.S. Pat. No. 1,540,752 shows marked differences. In addition to the off-axis imaging, the optional beam splitter, the optional tipped element astigmatism correction and the optional AGC leg that do not exist in U.S. Pat. No. 1,540,752, there are several point by point comparisons possible:

Five lenses (not four)

The Aperture Stop is in front of L0 (not in middle between L1 and L2 )

The rays are convergent between L1 and L2 (not divergent)

Aperture height=56% Ftotal, width=80% Ftotal (vs. 33%)

F2=2.5×Ftotal (vs. 2×)

F3=1.66×Ftotal (vs. smaller)

Alternate Implementations: There may be various modifications and variations to the concepts and implementations disclosed here that are within the scope of the present invention including, but not limited to:

The utility of this design is not limited to use in monochromatic imaging situations. By utilizing a different refractive index in L1 and possibly other lenses and rebalancing the surface specifications, this design can be made achromatic. The system can also be optimized for use with any other single wavelength instead of the design wavelength specified here.

Additionally, the singlet elements can be replaced by doublets to effectively simulate any range of refractive indices to aid with achromatic correction as well as gain degrees of freedom to address the residual fundamental aberrations.

This system is not limited to off-axis imaging. In the on-axis case where the object is substantially symmetrical to the optical axis, L4 would likely be centered. L4 would progressively shift the higher off-axis the object orientation becomes.

If the field of view was very small in an on-axis case, L4 could likely be dispensed with, but the utility of the tipped correctors for the beam splitter would remain.

This system (including the beam splitter and lenses) is not limited to BK7 glass; any combination of practical transparent optical medium could likely suffice to construct a system based on this design form.

As with all optical systems, the FOV can be scaled by scaling the optical elements. This makes this design of special interest in small FOV, very high-resolution laser scanners.

The utility of this design is not limited to the specific values or combinations of surface curvatures and materials specified in the preceding embodiments. Other system prescriptions with different lens specifications may be known to have better performance but be harder to manufacture.

The system is not limited to the size and shape aperture specified here. The system has been shown to have excellent imaging qualities with no aperture. Truly stunning imaging performance has been obtained with smaller apertures, at the expense of light budget.

The beam splitter is not required to utilize this design, especially for, but not limited to, off-axis imaging. If the beam splitter is omitted, the tipping of L2 and L3 should (although not required to) also be omitted.

The presence of the redundant, coaxial image path off the beam splitter has uses that far exceed AGC.

If the beam splitter is polarizing, a second linear or area array detector can be used to measure surface qualities such as wood grain orientation.

If the beam splitter separates colors, the second path can be used to monitor a second color laser. The second laser could be measuring or acquiring data from another location along the surface of the sample being measured.

The second detector could be replaced with an illumination source that could be used to create a specific illumination pattern along the length of the extended object, creating an optical encoder effect on the surface. These could be read by along the original image path. By analyzing the spacing of the observed illumination pattern, information about the surface normal where the original laser beam is being read can be derived.

The AGC detector in the specified AGC path is not limited to a long aspect ratio silicon detector. An array of fibers could be used to gather light from the AGC path, then bundled into a cable and routed to a single higher speed detector without the capacitance of the specified AGC detector. The AGC detector can be a point, line, or area detector. The AGC detector may comprise a single element or multiplicity of pixels.

This system is not limited to imaging line sources onto line detectors. The source may be a point, line, area, or volume source. The detector can be a point, line, or area detector. The detector may comprise a single element or multiplicity of pixels. There are significant advantages to looking at a line or point source with an area detector.

Further, the object can also be an area source. This design works well for 2D imaging in the extreme off-axis preferred embodiment and very well in on-axis imaging applications.

High Precision Mounting Structure for Optical Systems

FIGS. 4a and 4b respectively depict side and top views of the elements that must be located and supported by a preferred implementation of the present invention. The mounting structure must handle various different lens shapes, elements with tilt, a beam splitter at, for example, substantially 45° and a detector. FIGS. 8a and 8b depict a second image path formed using the beam splitter in FIGS. 4a and 4b. A preferred implementation of the mounting structure must also support the orthogonal mounting of the lenses and detector in the relative orientation shown. The mounting structure used to precisely and rigidly locate and support the optical elements is a critical factor in the construction of the measurement instrument.

Desired Specifications: Due to the complexity of the optical system and the requirements for high precision and stability, the mounting structure should preferably meet several specifications to accommodate the elements shapes and locations depicted in FIGS. 4a, 4b, 8a, and 8b:

The mounting technique should preferably be able to locate and orient the elements to within about 50 um laterally and longitudinally of the specifications from the optical CAD design.

The mounting technique should preferably be able to rigidly hold the elements in position and orientation to within about 50 um over a range of environmental conditions, including, for example, a +/−10° C. temperature swing and various types of vibrations and shocks.

The mounting technique should preferably accommodate tilted lenses and other tilted elements.

The mounting structure should preferably accommodate the variable center and edge thickness specifications resulting from the manufacturing processes used to construct lenses such as, for example, glass type lenses.

The mounting technique should preferably accommodate holding at least one beam splitter at an angle not limited to but preferably at 45° relative to the optical axis.

The mounting structure should preferably allow the mounting of the secondary detector depicted in FIGS. 8a and 8b at the location and angle specified by the optical design.

The mounting structure should preferably allow rework without excessive waste or destruction of components.

The mounting structure should preferably support reasonable manufacturability constraints such as low cost, reproducible physical tolerances and allow with batch processing techniques.

U.S. Pat. No. 6,441,908 provides an explanation of other aspects of a measurement instrument and provides helpful background information about optical systems that may be useful in describing the present invention.

Many examples of optical mounting structures have been developed. However, none exist that could simultaneously satisfy all or even most of the desired specifications. Therefore, the only useful existing information are studies on general optical mounting techniques. Ultimately, there are techniques utilizing physical clamping to constrain the lenses, and techniques utilizing adhesives, and, of course, combined methods. The techniques based on physical clamping may relate to the present invention.

Figure 10:
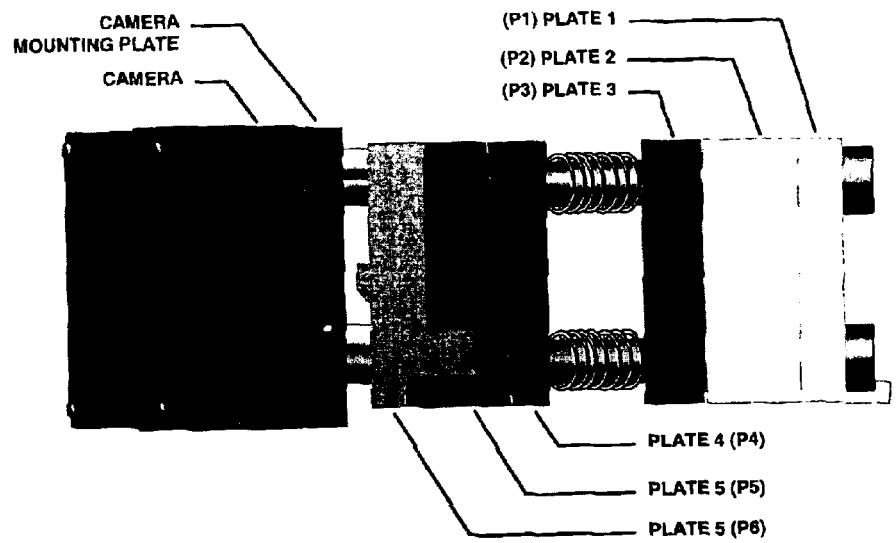
FIG. 10 illustrates a side view of an optical mounting structure.

Clamping Rail Mounting Scheme: Top and Side view diagrams of an Optical Mounting Structure of the present invention are shown in FIG. 9 and FIG. 10, respectively. The concepts behind the present invention are introduced and explained by a close examination of a preferred embodiment that meets the desired specifications. The design makes many novel contributions to the art of optical-mechanical mounting structure design. Referring to the figures, short descriptions of novel and/or important features of the Optical Mounting Structure are as follow:

To support and locate four lenses, six lens-clamping plates (P1 through P6) are utilized. The fifth lens in the preferred embodiment is mounted to the camera structure.

The first plate (P1) and the last plate (P6) are provided with hold down feet for mounting the entire structure to a base plate.

Four threaded alignment posts (e.g. bolts) with precision diameter and length shafts, similar to stripper bolts, pass through precision bored holes in plates P1 through P5 and bottom out in threaded holes in P6. Other fixation methods of the alignment posts to P6 may be contemplated.

These Alignment Bolts constrain each plate from lateral or rotational deflection, each plate can only move along the length of the bolt shaft.

Stiff springs located between P3 and P4 surround the Alignment Bolts and push P3 and P4 apart.

P6 forms the positional reference for the structure. The longitudinal position of plates P1, P2 and P3 are constrained since they are pushed up against the head of the Alignment Bolts by the springs.

The positions of plates P4 and P5 are constrained since they are pushed up against P6 by the springs once P1 through P3 are seated.

Compliance Concepts: Several features in the present invention result in characteristics that allow the structure to demonstrate the compliance desired by the specifications:

The springs and Alignment Bolts provide compliance for variable thickness lenses. If the lenses are oversized, the elements grow towards the middle (i.e. the area between P3 and P4 ), an advantageous condition for holding optical tolerances in the optical system. Of course, if the lenses are undersized, the elements would be biased away from the middle.

The springs and Alignment Bolts provide compliance for thermal expansion. As components in the structure expand, they are forced to grow towards the middle. The thermal expansion of the Alignment Bolts limits the longitudinal expansion of the plates within the structure and thus limits the longitudinal expansion of the optical path. Material choice and thickness can limit maximum expansion of the bolts.

By choice of material and thickness, P1 through P5 can be designed so its thermal expansion offsets that of the Alignment Bolts, effectively stabilizing the thermal expansion of the optical path.

Only one hold down foot on P1 (or alternatively P6) need to be used if a three-point mount of the structure is desired. This keeps the optical mounting structure's connection to the base plate from being over constrained, potentially causing deformation with environmental changes, shock or vibration.

To further avoid over constraining the optical mounting structure, a washer can be used on the hold down mounting foot in P1. P1 may then be constrained so it cannot lift off the plane of the base plate but the base plate can change lateral dimensions relative to the optical mounting structure without deforming the optical mounting structure.

Locating and Constraining Optical Elements: Several features in the present invention result in characteristics that allow the structure to locate and constrain the optical elements to the tolerances desired by the specifications. The following discussion refers to the cut-away side view diagrams in FIG. 11 and FIG. 12:

In a preferred embodiment, the exact locations of the optical elements were specified using an Optical CAD package. The shape of the components in the mounting structure were designed by "wrapping" the components around the CAD specification for the optical elements.

Figure 11:
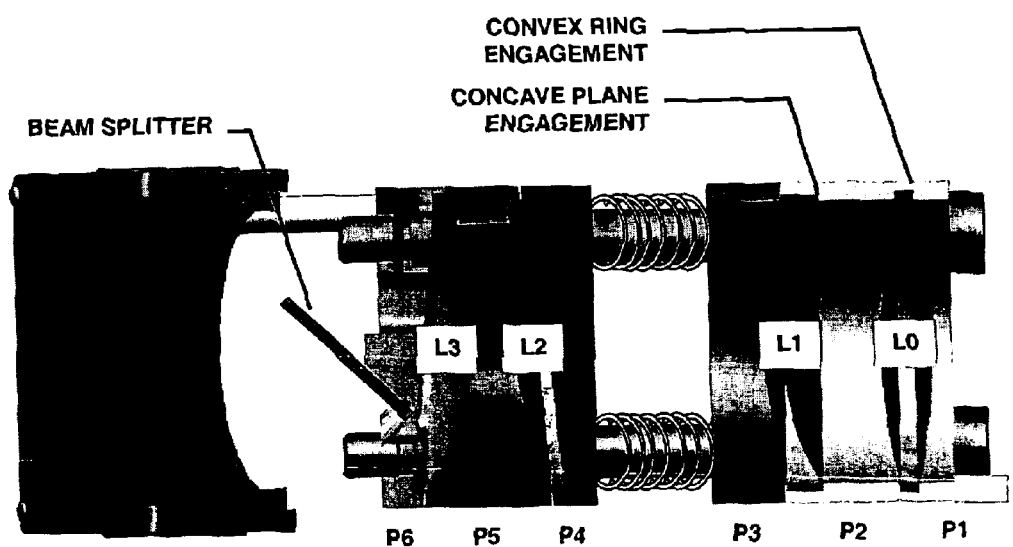
FIG. 11 illustrates a cut-away side view showing lenses captured in the mounting structure.
Figure 12:
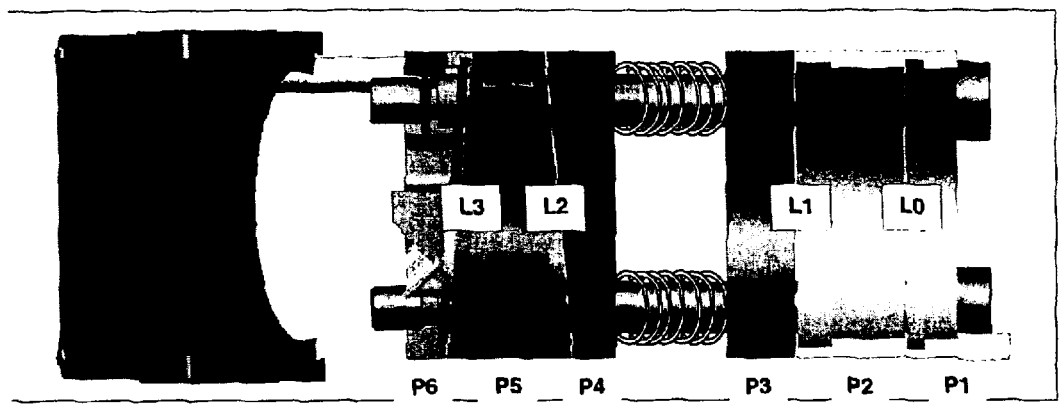
FIG. 12 illustrates a cut-away side view showing pockets where lenses get captured in the mounting structure.

FIG. 11 and FIG. 12 show the lenses that are automatically located and constrained in the specified locations by pockets formed in the faces of the clamping plates.

When capturing concave lens faces, the pockets are designed with planar bottoms that engage the ring along the edge of the concave face. The diameter of the pockets are relieved to surround and center the outside diameter of the element in the pocket. An example of this is the right face of L1 in FIG. 11 is engaged with the planar bottom and its diameter is surrounded by the pocket in P2.

When capturing convex lens faces, the pockets are design with a specification smaller than the lens diameter. In this case, the edge of a hole through the clamping plate forms a ring that engages the spherical convex surface of the lens. An example of this is shown in FIG. 11 where the left face of L1 engages with the edge of the thru-hole in P3.

When a bi-convex lens is captured by a ring of a thru hole edge on both sides, one plate has a pocket to accept the lens diameter and a thru-hole to engage a surface of the lens. An example of this is shown in FIG. 11 where the right face of L0 engages with the edge of the thru-hole in P1.

When a bi-convex lens is clamped by a ring of a thru hole edge on both sides, it is centered and constrained.

When a concave-convex (meniscus) lens is clamped by a plane on its concave side and a ring of a thru hole edge on its convex side, it is centered and constrained.

For any lens with a planar surface, that surface can be captured against a planar surface optionally at the bottom of a pocket that has relief to accept the diameter, just as with the concave surfaces.

In the case where a bi-concave or plano-concave lens is to be mounted, it will suffice to clamp the element between two planar reference surfaces and rely on the diameter of the relief pocket to center the lens. However, greater precision locating can be obtained if the outer edge of a thin protruding cylinder engages the concave surface. Such a protruding cylinder can be machined into the clamping plate as a small lip around the thru-hole that extends just past the edge of the planar bottom of the pocket.

The mounting of the tipped lenses L2 and L3 follows as above with some slight modifications. First, the interface between the two clamping plates is machined at an angle so the face is normal to the axis of the lens. In the case of P5, both faces are machined since the lenses on either side have different tip angles.

The right, planar side of L2 engages on the planar bottom of the shallow pocket provided in P4. Similarly, the slightly concave left side of L3 engages in a shallow pocket in P6.

In most of the clamping plates in FIG. 11, the edges of the thru-hole forms part of the engagement contact with the lens. In P5, the thru-hole only serves to pass light; it does not engage either L2 or L3. Instead, the ring formed by the edge of the pocket on either side of P5 engages the convex surfaces of both L2 and L3.

The gaps between the clamping plates are scaled so that the plates always engage the lenses and never contact each other directly. This scaling is determined by accounting for the thinnest lens allowed by the specifications contracted by the coldest possible temperature the structure will encounter, likely during storage or shipping.

Although not required by this design, an adhesive such as a room-temperature vulcanizing silicone adhesive can be used to further stabilize the lens positions by placing a few drops in the pockets prior to assembly. This adhesive is most useful to keep the lenses in place during any rework.

If the design utilizes engagements with the curved lens surfaces for centering in a particular pocket, then the diameter of the pocket can be enlarged to accommodate a wide manufacturing tolerance for lens diameter.

In a preferred embodiment, the Beam Splitter is affixed along its edges to about 45° shelves located on the left side of P6 on either side of the thru-hole. The beam splitter can be mounted to the shelves using an adhesive, clamped with a small bolt and an optional oversized washer, or preferably a combination of both.

The front of the camera is captured in a mounting plate which is in turn affixed to post(s) or tube(s) protruding from the back of P6.

Details on Plate 6: P6 is a complicated component that as shown can be hard to construct. Yet, its complexity allows the other components to remain inexpensive and easy to construct. The following features represented in P6 result in characteristics that allow the optical mounting structure to locate and constrain the optical elements to the tolerances desired by the specifications. The design of P6 is part of the reason the optical mounting structure is so easy to assemble and take apart for rework. The following discussion refers to the isometric diagram FIG. 13.

Hold Down Feet: The hold down feet in P6 anchor the entire optical mounting structure, in some lightweight applications the hold down feet in P1 could be omitted.

Alignment Posts: The Alignment Posts anchor in P6 and all other components are rigidly referenced to the Alignment Posts. Hence, P6 forms the positional reference for the entire structure.

Camera Mounting Posts: The camera is attached to the rest of the optical system via the Mounting Posts extending from P6. Hence, they are vital components in maintaining a rigidly focused system.

Beam Splitter: The preferred method by which the beam Splitter is held and mounted can be observed in FIG. 13. Small shelves are provided on either side of the thru-hole. It is vital these shelves are smooth and exist in a common plane to avoid stressing and cracking the beam splitter. It is also vital the shelves are oriented at the angle specified for the beam splitter, 45° in the preferred embodiment. Next to each shelf is a raised lip 0.002" thinner than the beam splitter. Each lip has a tapped hole that allows a bolt with an oversized washer to clamp the beam splitter down to the shelves. The beam splitter can also be adhered to the shelves (e.g. with an adhesive) to form a stable bond with the beam splitter in a permanent position.

Figure 13:
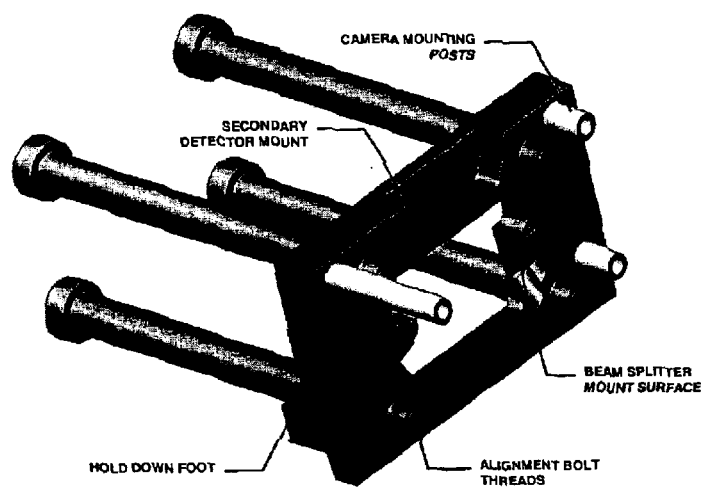
FIG. 13 illustrates an isometric view of plate 6 detailing the features for capturing the alignment bolts, mounting the secondary detector, holding the beam splitter, and holding the camera mounting posts.

Secondary Detector: The secondary detector in FIGS. 8a and 8b is mounted in a specific location at a specific angle. As shown in FIG. 13, P6 facilitates the mounting of the secondary detector by providing a mounting shelf at the desired angle. If the secondary detector is mounted in a frame, the frame can be bolted to the shelf with the provided holes, allowing the detector to be positioned very close to the backside of L3. Alternatively, if this mounting technique is not sufficient, a pair of Secondary Camera Mounting Posts (not shown—similar to the camera mounting posts extending out the back of P6) can be provided protruding up from P6 at the angle of the mounting shelf.

Figure 14:
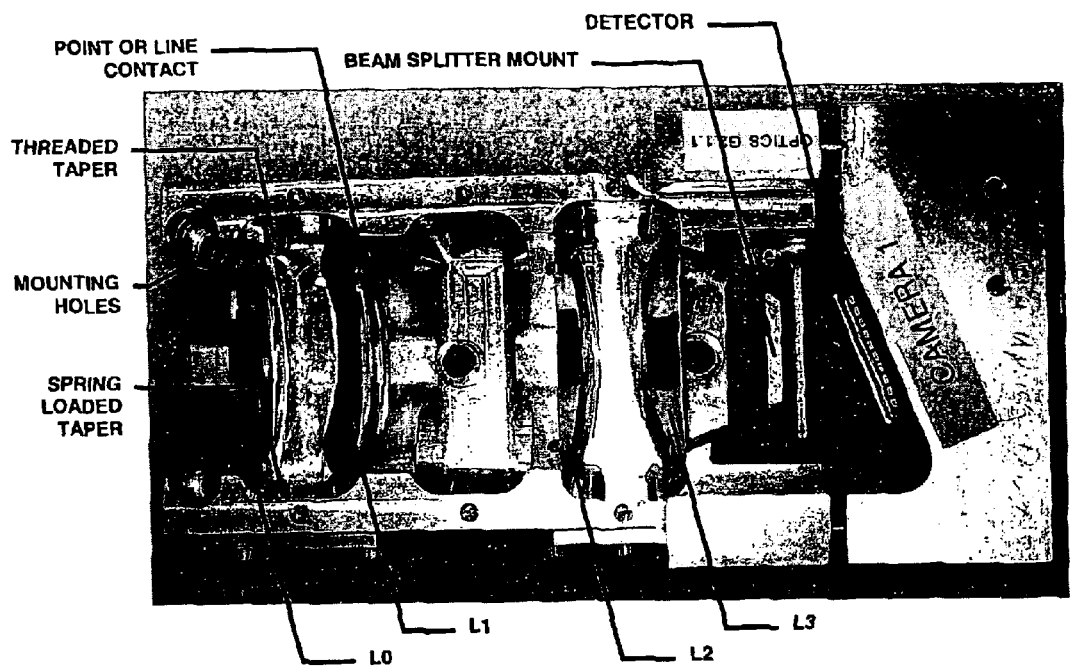
FIG. 14 illustrates a top view of a uni-channel optics mount structure shown with the beam splitter and 14 not installed.
Figure 15:
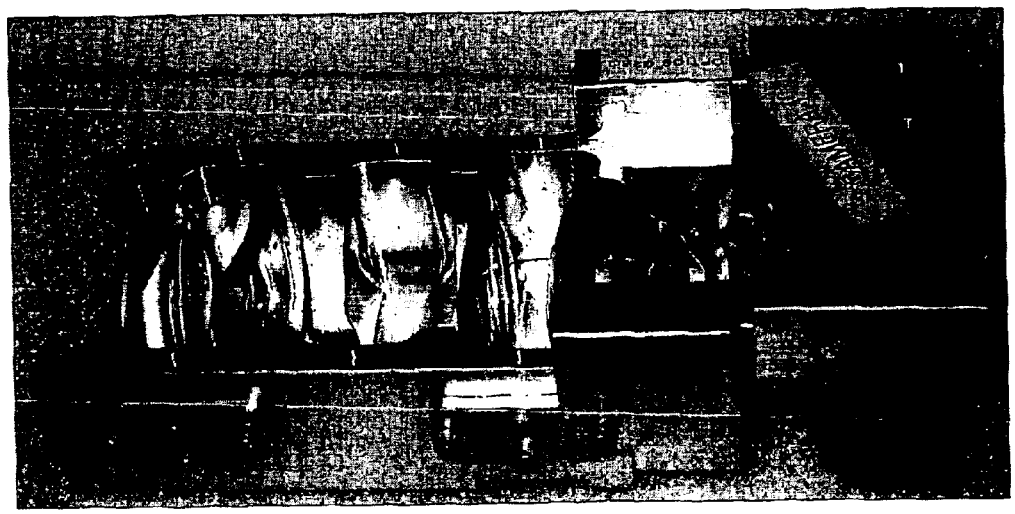
FIG. 15 illustrates an elevated view of a uni-channel optics mount structure shown with the beam splitter and 14 not installed.

Alternative Optical Mounting Structure: Another optical mounting structure is contemplated to meet the specifications of housing the optical system depicted in FIGS. 4a, 4b, 8a, and 8b. Although this particular design is not the most preferred embodiment of the present invention, the technique contains many novel contributions to the art of designing optical-mechanical mounting structures. This design is referred to as the "Uni-channel" Design and is represented in FIG. 14 and FIG. 15.

The Uni-channel was specifically designed to be very low profile in order to fit the smallest instrument case possible. To reduce height, the unused portion of the top and bottom of each lens were removed in, for example, a grinding step. The Uni-channel shown was constructed primarily with precision CNC mill operations from the topside of the chassis. The intention of the design was to allow the bulk of the chassis to be molded or cast and to use precision CNC mill post operations to establish precisely controlled surfaces for mounting the optics.

The Uni-channel utilizes a unique method to locate the lenses in the specified positions and rigidly hold them in place. The following design concepts rely on wrapping the mechanical design of the chassis around a CAD model of the optical path:

Height: Since the lenses were already modified to provide a precision flat on the bottom (and top), the bottom of the chassis has a reference plane so the lenses automatically are located at the desired height when the flat is in contact with the bottom of the chassis.

Orientation: Spherical lens surfaces always engage well with a ring, which is unfortunately hard to provide with a topside only CNC mill post operation. Instead, the lenses are positioned by first using a CAD package to specify a mounting surface such that when the lens is sitting on the bottom of the chassis, it will contact the mounting surface in a point or line contact that forces the correct location and orientation.

Hold Down: to hold the lens against the line/point contact surface, a spring plunger with a tapered tip is provided extending from the sidewall of the chassis. The pressure of the spring forces the tapered tip forward, which engages at or near the edge of the lens and forces the lens substantially laterally and/or back against the line/point contact.

Lateral: Protruding from the wall opposite from the spring plunger, a pin with a tapered tip engages the other side of the lens; trapping the lens and clamping it back against the line/point contacts. The pin is threaded, so its position can be adjusted, providing a moving stop to laterally fix the position of the lens.

Stability: to permanently stabilize the lenses in position once the proper location has been obtained, an adhesive (e.g. of wicking type) can be applied where the line/point contact with the lens is formed.

Beam Splitter: The beam splitter is mounted in a substantially identical fashion as per the Clamping Rail design discussed previously.

Camera Mount: Although the camera shown is different than that in the Clamping Rail configuration, the mounting scheme makes substantially identical use of the Camera Mounting Posts.

Secondary Detector: Provision for mounting a secondary detector is provided on the bottom side of the chassis.

In this case, the secondary detector would preferably be mounted to a tapered plate or angled bracket to allow the secondary detector to sit at the correct angle.

Alternate Implementations: There may be various modifications and variations to the concepts and implementations disclosed here that are within the scope of the present invention including, but not limited to:

The Clamping Rail Mounting Structure is not limited for use with off-axis optical systems, it may perform with any orientation of object or image.

The Clamping Rail Mounting Structure is not limited to rotationally symmetric or even bi-laterally symmetric optical systems. It is especially useful for mounting optical systems with many compound lens tilts.

The Clamping Rail Mounting Structure is not limited to 6 plates or a four or five lens system. It is useful for as few as one lens and is only limited by the practical length of the Alignment Bolts. Other elements including, but not limited to, filters, polarizers, mirrors and gratings may be mounted in such a structure.

The Clamping Rail Mounting Structure is not limited to the specific plate shapes or sizes, or the specific lens shapes or sizes discussed in this disclosure. It is scalable for various lens sizes and shapes and it will work with aspheric lens shapes.

The Clamping Rail Mounting Structure does not require the air space as shown between L2 and L3. A solid spacing element could be utilized here and/or in locations between other lenses as desired.

The Clamping Rail Mounting Structure does not require the use of internal compliance springs (e.g. springs over alignment bolts). The structure could be engineered to allow springs on the outside of the clamping plates. Further, the springs could be replaced with flat springs such a spring washers, or in some cases, contracting springs could be utilized.

The Clamping Rail Mounting Structure does not require four Alignment Bolts. As few as two posts have been successfully demonstrated, the upper limit is a matter of practicality.

The Clamping Rail Mounting Structure could function with the complexity of P6 distributed alternatively to other components. For instance, any component could be designed to contain the hold down feet; the beam splitter could be housed in a separate clamping plate, as could the secondary detector mount.

The utility of the Clamping Rail Mounting Structure does not rely on the presence of the secondary detector.

The Clamping Rail Mounting Structure could be configured so that instead of the Alignment Bolts threading into P6, they could pass through and engage threaded "nuts" on the far side of P6. The springs would still bias the optical elements while the length of the optical system would be constrained to the distance between the bolt head and the position of the nut.

The Clamping Rail Mounting Structure can be constructed from many materials in addition to or instead of the aluminum clamping plates and the steel Alignment Bolts preferably utilized here.

The Clamping Rail Mounting Structure can be used in other optical systems besides laser scanner optics including, but not limited to, machine vision systems, projection systems, spectrographic instruments and biological sensor systems. It can be used in conjunction with micro-displays, area array cameras, and flexible light conduits.

The Clamping Rail Mounting Structure can be augmented by a clamping plate that houses illumination device(s) such as LED(s), used for self-illumination of scenes recorded by the optical system.

Camera Mounting Techniques for Optical Systems

We have constructed an optical imaging system, depicted in FIG. 1, that requires an extremely precise and stable alignment of the detector relative to the optical axis. We needed to devise a mounting mechanism with the following characteristics:

The position of the detector must be adjusted in 5 axes relative to the optics,

The X, Y, and Z axis needed to be adjusted over a 4 mm range,

The Roll and Yaw needed to be adjusted over a 3° range with at least 30 arc second resolution, Once aligned, the detector must be permanently locked in place with substantially 1 um stability, It was desired not to incorporate high precision, high cost adjustment permanently into the optical assembly, we desired to be able to put the precision alignment capabilities into the reusable assembly tooling and to keep the built-in cost low, The success of the technique should not rely solely on super-tight machining tolerances, The assembly must be disassembled for rework without excessive scrapping of parts.

We also needed to devise a technique for aligning the detector to the optics that had the following characteristics:

The X, Y, and Z axis needed to be adjusted with at least 1 $\mu$m resolution,

The Roll and Yaw needed to be adjusted over a 3° range with at least 30 arc second resolution, The detector must be aligned to bring the whole image into the best possible focus.

The requirements for developing this mounting technique are illustrated by examining the top view of an optical layout of a laser metrology system shown in FIG. 1. The system shown is in an Scheimpflug configuration where both the object and the image are tilted relative to the optical axis. In the exemplary embodiment of the invention that follows, the object is a line defined by the locus of points along a laser beam extending from point A to point B. The image formed by the system will be approximated by a line extending from location A' to location B'. For the detector, a linear array CCD camera, to capture the best focused image it must be aligned in X, Y, Z to be collinear with the image. Further, the detector must also be aligned around the Z axis (Yaw) and especially around the X axis (Roll). Since the Laser and the Optics together rigidly define the location of the Object, the Detector must be aligned in 5 axes relative to the optical axis and remain stably aligned for the system to function properly.

Breadboard Positioning Stages: In the system in FIG. 1, the detector could be positioned using a build up of rotation stages and translation stages typically used on optical breadboards. An assembly of these stages incorporated into the system design could provide the desired positioning tolerances but would have a prohibitive cost and a large physical footprint. Further, even with careful engineering and costly components, such an assembly would likely be too bulky with too many parts to be able to hold adjustment in the face of environmental changes such as temperature and vibration.

Flexure Positioning Stages: A more suitable method of positioning the detector would be to utilize a unified mechanism that realized rotation and translation positioning with flexture based positioning stages. Such mechanisms can typically be constructed to be more compact than typical breadboard stages, with a lower cost and similar positioning precision. When properly engineered, flexture stages should also exhibit far greater immunity to environment changes. However, a 5 axis flexture stage that can meet the specifications set forth here might not actually be simple to construct nor inexpensive to manufacture. One issue is how the flextures will be adjusted. To adjust a typical flexture element, it is forced "open" with the use of a threaded fastener such as a bolt. To achieve 1 um sensitivity requires the use of super-fine threads or possibly a differential screw, both of which start driving up cost and require tight manufacturing tolerances. Another issue is how these adjustments would be permanently locked without biasing the position and still allowing for rework/disassembly.

Base Plate Clamping: An alternative to the unified flexture mechanism would be to attach the detector to a two axis Roll, Z stage using either flextures and/or standard breadboard stages. The two axis stage could in turn have a "shoe" that allowed it to be moved freely along the surface of the base plate and then be locked down in the desired position. This sliding shoe would allow for adjustment in X, Y and Yaw. Although this arrangement provides the desired degrees of adjustment, there are several drawbacks to this approach besides the cost and bulk of the two axis stages. The first is the challenge of adjusting the sliding shoe with the desired precision. The next is firmly affixing the shoe to the base plate once alignment is achieved, without perturbing the precision of the alignment. Finally, there are issues with the stability of such a configuration with environmental changes, especially during thermal cycling.

Detector Mounting Solutions: The inventions in this disclosure are intended for, but not limited to, use in rigidly mounting the detector elements in a non-contact laser scanner profilometer, similar to the systems discussed in US Pat. No. 6,441,908. Examples of the implementations and identification of the preferred techniques will be made as they relate to designing and constructing laser scanning profilometer systems.

Post with Adhesive Clamp Configuration: To rigidly hold the detector relative to the optics, there must be some form of physical link between the detector and the optics. This link must allow adjustment, yet be locked in place when desired. One method to achieve this is to utilize three rigid Mounting Posts shown in FIGS. 16a–16c that extend from the Optics Block assembly. The optics block assembly comprises a populated mounting structure for the optics. As shown, a Mounting Plate adapter is affixed to the detector. The Mounting Plate has oversized thru holes that are sized and placed to accept and provide clearance around the Mounting Posts when the detector is in the nominal position relative to the optics. The use of posts through oversized thru holes allows the position of the detector to be adjusted relative to the optics.

As shown in FIG. 16a, the oversized holes allow the detector to be translated along the plane of the image, corresponding to the YZ plane from FIG. 1. Holes that have a diameter 4 mm larger than the diameter of the post will achieve the range of motion previously specified. As depicted in the FIG. 16b, the use of a thru hole allows a great range of translation along the axis of the post, or along the X-axis. FIG. 16c depicts how Yaw, Pitch and Roll can all be obtained by rotating the detector relative to the Mounting Posts. Therefore, this mounting configuration is compatible with position adjustments in all 6 axes.

If the Mounting Posts are no more than 75 mm apart from each other, the 4 mm clearance in the thru holes should provide the desired 3° range of adjustment. To obtain greater stability, the Mounting Posts are placed at the outside edges of the Mounting Plate to maximize the distance between them. To facilitate adjustment range, the thickness of the Mounting Plate is approximately the same as the diameter of the Mounting Post.

Adhesive Clamping: When the detector is in the desired location relative to the optics, it can be permanently locked in place by filling the gap between the Mounting Post and the Mounting Plate with a substance (e.g. an adhesive) that starts in a deformable state such as a liquid and sets to a solid state. The adhesive (e.g. glue) can be injected into the gap through an access hole, as depicted in FIG. 17, or through the front or back of the gap. Once the adhesive clamp is fully cured (e.g. by heat, UV radiation, etc.), the detector is now a stable, rigid part of the optics block assembly. The entire assembly can be moved, stored and installed as a single unit that will not lose the precision adjustment of the detector relative to the optics.

There are many substances such as epoxies, Room Temperature Vulcanizing adhesives (i.e. family of curable rubber-like materials, generally silicone-based adhesives) and urethane based adhesives that can perform this locking function, an ideal choice being Loctite Durabond E-20HP available from Loctite Corp, 1001 Trout Brook Crossing, Rocky Hill, Conn. 06067. There are specifications to review and consider when choosing an adhesive. Adhesives with high shrinkage could move the detector by pulling on the Post during cure. Adhesives with large thermal expansion could also potentially move the detector during thermal cycling. Fortunately, if the gap between the Mounting Post and the Mounting Plate is kept small, these motion effects will be sub micron for modest temperature excursions. Brittleness with aging, out gassing characteristics, creep, and modulus are also adhesive specifications worth investigating and optimizing.

Disassembly: Another useful aspect to consider when choosing the adhesive is the maximum rated temperature range. Adhesives that fail at reasonable temperatures, such as 300° F., will hold over normal operating environment fluctuations. However, the adhesive will advantageously fail with the application of heat, e.g., with the aid of a heat gun, allowing disassembly of the system for rework or for fine-tuning of the system. Generally, all of the adhesive can be removed, allowing all the parts to be reused.

Since heat application might damage the detector or the optics, a method of safe disassembly or adjusting might be provided. FIGS. 18a and 18b show an option where instead of the Mounting Post press fitting into the Optics Block, it slip-fits tightly into a counter-bore. If the bottom of the counter-bore has a threaded hole and the Mounting Post is hollow, then a bolt can be used to clamp the Mounting Post rigidly into place. However, the Mounting Post can be removed from the Optics Block by removing the bolt and pulling the Post from the Optics Block. In this fashion, the detector can be removed from the Optics Block, resulting in an assembly including the detector, the Mounting Plate and the Mounting Posts. The detector can optionally now be removed from the Mounting Plate, leaving just the Mounting Plate and Posts, which can be safely heated to remove the adhesive. It is useful to ensure that either the clamping adhesive does not get on the head of the retaining bolt or the head is coated with a release agent prior to adhesive injection.

Detector Mounting Options: There are other Post with Adhesive Clamp configurations. Examples of which are as follow:

Configurations with Four or More Mounting Posts: The Post with Adhesive Clamp configuration makes use of three Mounting Posts because they provide sufficient support for the detector and a fourth post interfered with other mechanisms in the optical configuration in the preferred embodiment. However, the Post with Adhesive Clamp technique will work with four or even more Mounting Posts. It should be noted that the achievable range of compound positional adjustment will be determined in part by the number of Posts utilized, the distance between the Posts and the size of the gaps between the Mounting Plate and the Posts. The use of more Posts could constrain the range of motion and require the use of larger Thru Holes.

Configurations with Two Mounting Posts: The Post with Adhesive Clamp technique will also work with two Mounting Posts. However, such a configuration might be more susceptible to environmental changes such as shock. In this case, sufficient rigidity can be obtained by making sure the engagement length (thickness) of the Mounting Plate is at least 2 times the diameter of the Mounting Post. However, a thicker Mounting Plate will limit the angular positioning range, possibly forcing the use of a larger gap between the Mounting Plate and the Mounting Post.

Configurations with One Mounting Post: The Post with Adhesive Clamp technique will work with one Mounting Post. All resistance to twisting and vibration will come solely from the strength of the adhesive bond with the Mounting Post. In this case, the mass of the detector assembly could cause significant torque on the single adhesive bond. Therefore, such a configuration will be more susceptible to environmental changes such as shock. Sufficient rigidity can be obtained in this configuration by making sure the engagement length of the Mounting Plate is several times the diameter of the Mounting Post and by keeping the mass of the detector assembly small.

In the above configurations, the posts are described as being affixed to the optics block with the thru holes provided in the mounting plate. However, the posts may alternatively be affixed to the mounting plate with the thru holes provided in the optics block. Also, a combination of alternating post/hole configurations may be employed.

Configurations with a Mounting Tube: The One Mounting Post configuration can be modified for greater stability by making the diameter of the Mounting Post very large. One adaptation is to make the Mounting Post into a Mounting Tube that surrounds the optics path without obstructing it, as shown in FIG. 19a. The corresponding over-sized hole in the Mounting Plate will also have to grow. One feature that preferably may be included in this configuration is a dam to keep the adhesive from wicking and contaminating the detector. FIG. 19a shows the dam constructed from a compliant O-ring. The large size of the clamping region will give this configuration good resistance to twisting and vibration. The tradeoff is the limited range of motion this configuration allows unless a very heavy application of clamping adhesive (i.e. along with a larger diameter thru hole) is allowed.

There are options to the Mounting Tube concept that may be employed. For example, the tube may instead be affixed to the Mounting Plate and the oversized hole placed in the Optics Block, resulting in an almost identical joint. Another interesting option is that nested tubes can extend from both the Mounting Plate and the Optics Block (as shown in FIG. 19b), allowing the joint to form between well away from either the Mounting Plate or the Optics Block and avoiding contaminating the system with the clamping adhesive.

Dog Bone Configuration: The Post with Adhesive Clamp configurations all can obtain the performance desired as far as adjustability, rigidity, stability, low cost and rework compatibility. However, they do not allow repositioning of the detector once the adhesive clamp is cured without significant rework effort. A mounting technique related to Post with Adhesive Clamping that allows repositioning is depicted in FIGS. 20a–20c.

Here, the Mounting Posts are shaped as Dog Bone connectors that comprise shafts with larger diameter balls integrally or non-integrally formed or attached at either end. Instead of oversized holes, the Dog Bones are preferably seated in tight holes that have a provision for clamping the ball in place without biasing the position adjustment, as shown in FIGS. 21a and 21b. As depicted in FIGS. 20a–20c, the Mounting Plate and the Optics Block engage the balls on the Dog Bones. Lateral translations and rotations are allowed by the pivoting of the balls in the Clamping Holes. Axial adjustments are allowed by moving the ball axially in the Clamping Holes. With compound motions, it is possible to adjust the position of the detector in all 6 axes.

When the detector is in the desired position, it can be locked in position by, for example, tightening a Clamping Bolt at either end of each Dog Bone. As depicted in FIG. 21b, the Clamping Bolt closes a Flexture Clamp, tightening the thru hole around the ball and providing a rigid, stable connection. To handle environmental variations, the Flexture Clamp should be designed with enough compliance and high enough spring rate so that with maximum expected thermal expansion, shock or vibration, the clamp still provides enough pressure to securely clamp the ball in place. To reposition the detector, the bolts can be loosened, allowing adjustments. They can then be tightened to provide stable and rigid mounting in the new position.

Material choices affect the performance of the Dog Bone mounting configuration. Preferably, the ball (which may comprise a different material than the dog bone shaft) and the Mounting Plate and/or Optics Block will be of similar materials so thermal variations have minimal effect. The ball, Mounting Plate, and Optics Block should be of hard materials that do not dent easily when the Flexture Clamp is tightened. Such dents would result in the system developing a "set" and reduce the ability to reposition with high precision. If the ball is harder than, e.g. the Mounting Plate, then the Mounting Plate will form a dent. The Dog Bone may then be repositioned to new axial positions in the clamping holes, allowing the assembly to be adjusted a few times before the components are too damaged to allow precision adjustment. A sacrificial split sleeve may be introduced in the Clamping Thru Hole between the ball and the Mounting Plate (and/or between the ball and the Optics Block). This sleeve would preferably be a soft material such as, for example, brass and it would act to line the Clamping Hole. Therefore, any dents would occur in the disposable sleeve. With repeated readjusting, the sleeve could be axially repositioned in the Clamp Hole a few times until the sleeve was used up, then it could be replaced at low cost. It is also noted that as an alternative to the dog bone configuration, one of the end balls of the dog bone at either end may be replaced by a post end as per the posts of any of the embodiments described above. For example, a dog bone end may be simply affixed to either the optics block or the mounting plate, or instead the dog bone may have at one end threads for securely engaging either the optics block or the mounting plate.

In any of the embodiments above, the cross-section of the posts, tube, or dog bone shaft may be circular or may be any other shape as desired for design or rigidity purposes.

Alternate Implementations: The concepts in this disclosure are not limited in application solely to the building of Laser Scanners. There may be various modifications and variations to the implementations disclosed here that are within the scope of the present invention, including but not limited to:

- The optical system in FIG. 1 only requires alignment in 5 axes to align the detector with the image. However, the Post with Adhesive Clamp and the Dog Bone techniques both allow a full 6-axis alignment. This 6-axis alignment capability would also be advantageous for an optical system involving a 2D object imaged onto a 2D array or area detector.
- In addition to positioning the detector relative to the optics, the Post with Adhesive Clamp and the Dog Bone techniques may be used to mount and position the object relative to the optics. Such a configuration might also be useful in positioning the image source in projection displays.
- The Post with Adhesive Clamp and the Dog Bone configurations can also be used to mount and position the optics relative to either an object or fixed image.
- The detector mentioned in the Laser Scanner example above may be a linear array camera. Considering other optical systems in different applications, the detector may also be any other form of optical detector including, but not limited to, a 2D area array, a single large area photo detector, an array of fiber optic pickups or even a viewing screen.
- The object in the Laser Scanner example above was the locus of points along a laser beam. Considering optical systems in other applications, the object can have other forms including, but not limited to, 1D objects, 2D objects, or 3D objects from other illumination sources, relay images from other optics, printed objects, biosensor sample locations, micro-displays, CRTs and LCD displays.
- The Post with Adhesive Clamp and the Dog Bone configurations may be used for more than aligning optical systems in the Scheimpflug configuration. In the general case, they will serve for mounting and aligning any number of individual components or assemblies relative to each other for any degree of off-axis including straight on.
- A series of multiple optical elements can be mounted and aligned with each other at a potentially different pose by connecting a series of Mounting Plates with corresponding Post with Adhesive Clamp or Dog Bone configurations.
- Finally, both the Post with Adhesive Clamp and the Dog Bone configurations are not limited to the field of optics and can be used in any field where mounting and precision alignment between different components is desired.

Focus and Alignment for Optical Systems

The requirements for developing this focusing technique are illustrated by examining the top view of an optical layout of a laser metrology system shown in FIG. 1. The system shown is in an Scheimpflug configuration where both the object and the image are tilted relative to the optical axis. In the exemplary embodiment of the invention that follows, the object is a line defined by the locus of points along a laser beam extending from point A to point B. The image formed by the system will be approximated by a line extending from location A' to location B'. For the detector, a linear array CCD camera, to capture the best focused image it must be aligned in X, Y, Z to be collinear with the image. Further, the detector must also be aligned around the Z axis (Yaw) and especially around the X axis (Roll). Since the Laser and the Optics together rigidly define the location of the Object, the Detector must be aligned in 5 axes relative to the optical axis and remain stably aligned for the system to function properly.

Figure 22:
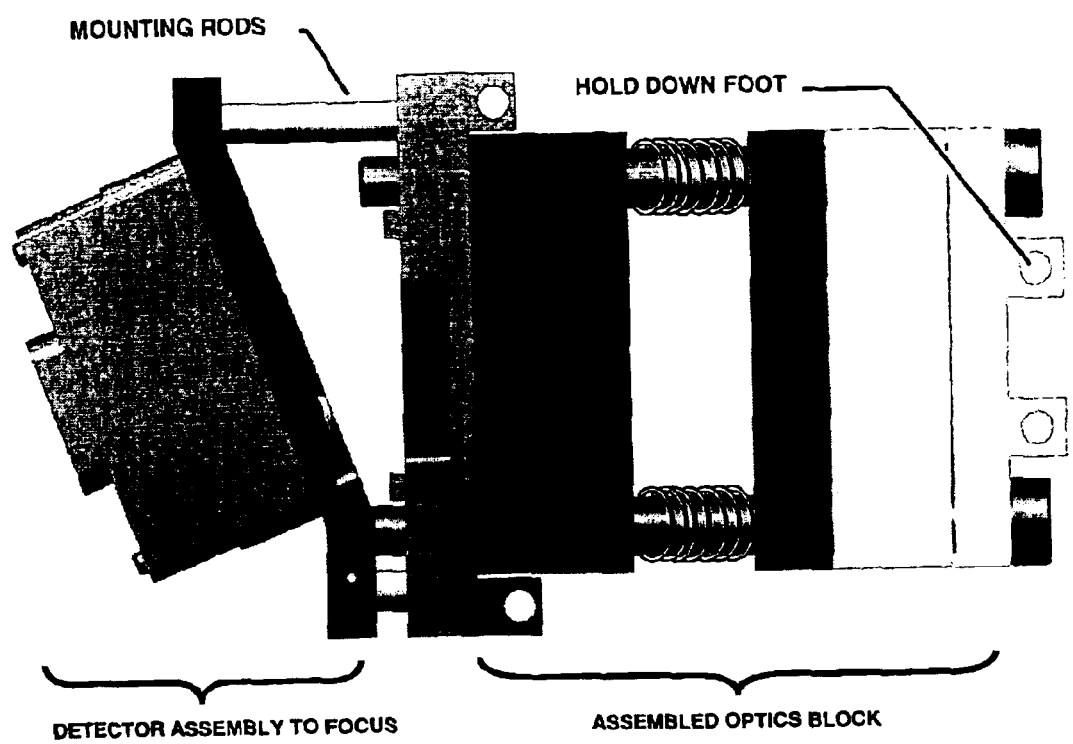
FIG. 22 illustrates a top view of an optics block and camera assembly to be focused.

Requirements: A preferred embodiment of the present invention will allow the focusing of the optical assembly shown in FIG. 22. The Assembled Optics Block contains rigidly mounted optical elements in a state of precision alignment. The Detector Assembly contains a linear array camera and some optics, all mounted on the Camera Adapter (Mounting) Plate. The Detector Assembly "floats" on the Mounting Rods that extend from the Optics Block through oversized holes in the Cameras Adapter Plate. The location of the Detector Assembly relative to the Optics Block must be optimized to create a crisp focus across the entire linear array. When the desired focus is achieved, the Detector Assembly's position will be frozen by clamping the Camera Mounting Plate to the Mounting Rods. Clamping will be achieved with adhesive used to fill the oversized holes. When cured, the entire Assembly will be a single, rigid unit that can be moved as a unit and still keep a precision focus.

Referring to FIG. 1, the focusing technique and mechanism must support the following specifications:

- The position of the detector must be adjusted in 5 axes relative to the optics,
- The X, Y, and Z axis needed to be adjusted over a 4 mm range,
- The X, Y, and Z axis needed to be adjusted with at least 1 $\mu$m resolution,
- The Roll and Yaw needed to be adjusted over a 3° range,
- The Roll and Yaw needed to be adjusted with at least 30 arc second resolution,
- Once aligned, the detector must be permanently locked in place with substantially 1 um stability,
- The precision alignment capabilities must be contained in reusable assembly tooling to keep the built-in cost of the assembly low.

Figure 23:
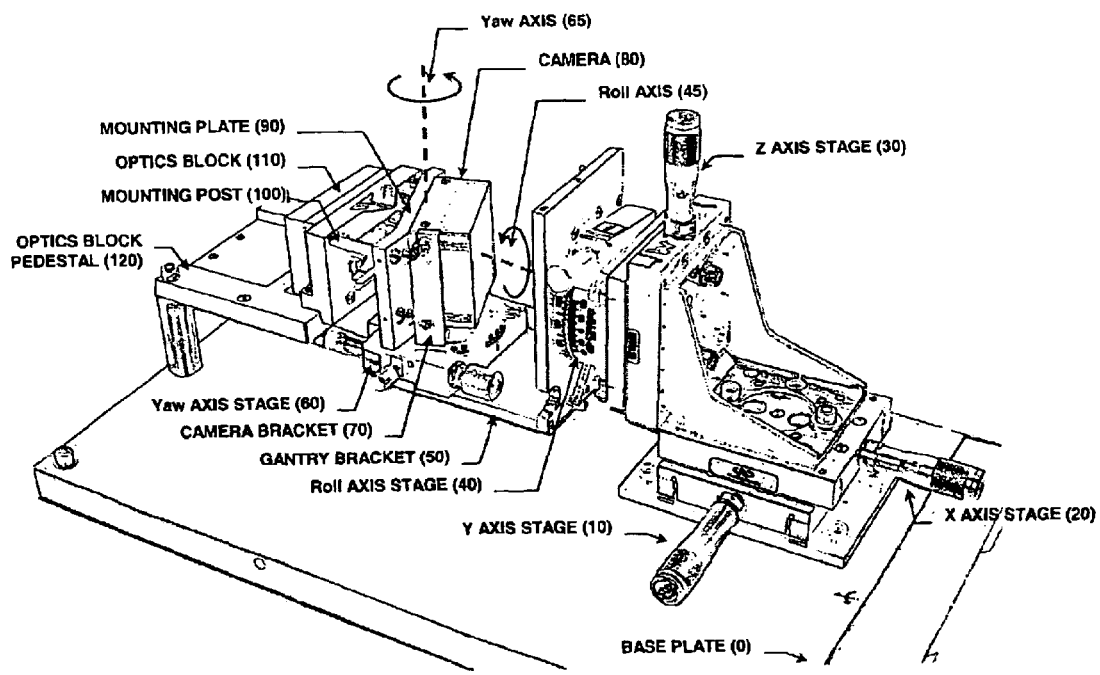
FIG. 23 illustrates a five-axis gantry configuration used to position a camera relative to the optics block for focusing and curing of an adhesive clamp.

Detector Assembly Positioning Tooling: The tooling developed for physically aligning a preferred optics assembly is shown in FIG. 23. The tooling is housed on a base plate (0). The entire assembly on the base plate shown in FIG. 23 is installed as a subsystem of the focus table shown in FIG. 24a. FIG. 23 illustrates the optics block (110) being affixed through its hold down feet to the optics block pedestal (120). The height of the optics block substantially determines the optical axis and hence substantially the working height for the alignment system. The detector assembly is affixed to the camera bracket (70) via attachment to the camera body, not the Camera Mounting Plate (90).

The adjustment tooling is an assembly of five manual motion stages and the brackets desired to orient the stage motion correctly.

An X stage (20) is bolted orthogonal to a Y stage (10) that is bolted to the base plate.

A Z stage (30) is mounted orthogonal the X, Y stage using a 90° bracket.

A Roll axis stage (40) is affixed to the face of the Z stage so that its roll axis (45) substantially aligns with the geometric center of the linear array in the camera. When the X, Y, Z stage is in its nominal (home) position, the roll axis should be substantially parallel to and substantially coaxial with the optical axis.

A Gantry Bracket (50) is attached to the Roll stage and serves as a shelf to mount the Yaw axis stage (60).

The Yaw axis stage is aligned so that its Yaw axis (65) substantially aligns with the geometric center of the linear array in the camera.

The Camera Bracket (70) is affixed to the Yaw axis stage and bolted to the side of the Camera (80).

The oversized holes in the Camera Mounting Plate (90) engage the Mounting rods (Posts) (100).

The alignment of the Roll and Yaw axis allows all five axis of adjustment to be made relative to the geometric center of the linear array on the camera. This is an important feature since it allows the detector alignment to be adjusted on independent axes with minimal or no cross axis coupling. When the detector is aligned, the clamping adhesive is introduced into the oversized holes in the Mounting Plate. Once cured, the camera is released from the Camera Bracket and the optics assembly is removed from the optics block pedestal as a single, rigid, stable, precisely aligned unit. This assembly can then be set aside in inventory and integrated into the measurement instrument later.

Focus Table Setup and Methodology: The setup for the focus table is depicted in FIG. 24a. The setup starts with a 1:1 scale plot of the optics path including the laser line, the object location, the rays traced and the optics position. The plot is affixed to the surface of the alignment table. A scattering screen is then carefully installed to precisely align with the object location. The screen has a very narrow (about 0.030") box drawn on it that surrounds the entire field of view of the imaging optics at a height determined by the height of the optical axis when the optics block is installed on the optics block pedestal. The target lasers (preferably five lasers A–E) are carefully focused on the screen to make the smallest spot possible. Using the Yaw, Pitch stages the lasers are mounted on, the spots are then aligned with the ray trace and inside the target box on the screen.

The positioning tooling may then be used to adjust the five-axis position of the detector assembly to optimize the image of the lasers spots as seen by the camera. The camera image can be monitored using a frame grabber (FIG. 24b) configured to show close ups of preferably five regions on the camera image. Focusing is aided by real-time display of preferably both the maximum pixel intensity and the full width half max (FWHM) of each image spot. The general goal is to simultaneously maximize the intensity while minimizing the width of each spot. Misalignment of as little as about 3 $\mu$m can be detected and substantially aligned out with this focus setup.

The adjustability of the focus tooling combined with the repeatability, acuity and ease of alignment afforded by this focus table setup make it possible to build a measuring instrument capable of resolving the position of a spot along the object to within about 0.001" or about 1:12,000 of the whole field of view. The use of five laser spots that span the field of view makes it possible to identify and balance out defocus trends across the field of view, such as field curvature, that would not be possible using a single spot or even three spots. Note that use of the laser shown in the upper right of FIG. 24a would only allow one point at a time to be used for focusing. The use of scattered laser spots simulates the way the scanner will be used in a fashion that trying to focus a printed target on the screen would not. The use of Yaw, Pitch stages to aim the individual target lasers allows them to be precisely positioned exactly along the field of view. Once adjusted, the spots remain stably aimed, so the next assembly can be focused without the need for table setup and configuration.

Figure 25:
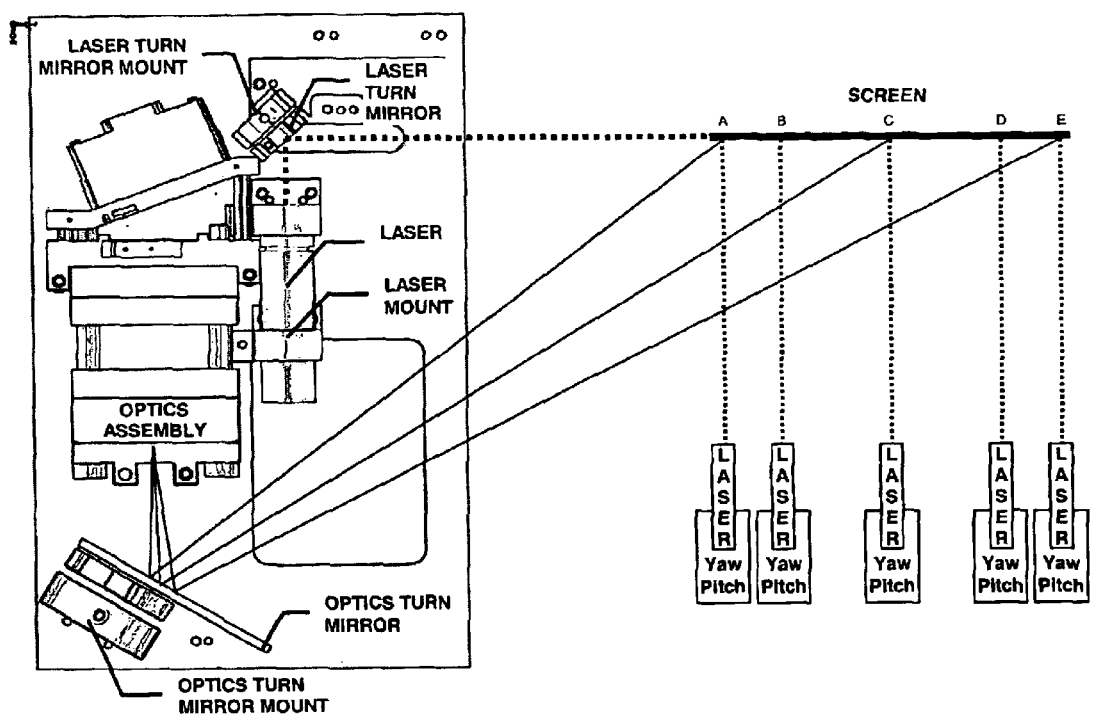
FIG. 25 illustrates a focus table configuration for a base plate with a folded optics path.

Optics Path Foldup and Alignment: Once the entire optics assembly (i.e. camera and optics block) is focused and rigidly locked into alignment, it can now be installed onto the base plate of the final measuring instrument. A system containing an unfolded optics path, such as that shown in FIG. 1, would be larger than it needs to be and might present some difficulties in achieving alignment. A preferred embodiment of a base plate with a folded up optical path is shown in FIG. 25. It is installed on a focus table and aligned with a ray trace similar to that used in FIG. 24a. The pre-focused optics assembly is installed so that its imaging path is off a first surface turning mirror installed in an ultra-stable kinematic Yaw, Pitch mount (KS05, KS1, Thor Labs, PO Box 366 Newton, N.J. 07860). The laser is also installed so it reflects off a first surface turn mirror installed in a second ultra-stable kinematic Yaw, Pitch mount.

The adjustment and alignment of the base plate is as follows:

The laser turning Yaw Pitch mount is adjusted so that the laser is traveling substantially level with the focus table surface and substantially perpendicular to the long axis of the base plate. In addition, the kinematic laser turning mirror mount has enough adjustment to allow the laser to be laterally adjusted to travel substantially along the line of the screen. The target box on the screen now is substantially collinear with the path of the laser and can represent the object in the final alignment of the measuring instrument.

The laser turning mirror mount can be locked down using an integrated clamp. For extra security, a thread locking adhesive compound or other adhesive material may also be used.

Using the frame grabber again, the Yaw and Pitch of the optics turn mirror mount can be adjusted to bring the field of view of the optical assembly into alignment with the target lasers on the screen. The Yaw adjustment will have the effect of moving the field of view of the optics assembly back and forth along the face of the screen, so it can be used to center the field of view. The Pitch adjustment will move the field of view along the screen perpendicular to the line that represents the field of view. This is a critical adjustment because it is aligning the very narrow field of view of the camera (only up to about 250 $\mu$m at the widest) with the laser line. The target lasers and hence the measuring laser will not be visible on the camera image if this alignment is even slightly out of adjustment.

Once the optics turning mirror is adjusted, it can be locked in the same fashion as the laser turning mirror adjustment.

The base plate with the folded optical path is now adjusted and ready for installation in the instrument case. The use of the turning mirror in ultra-stable kinematic Yaw, Pitch mounts allows the pre-focused optical assembly to be installed and permanently adjusted so its field of view aligns with the path of the laser to within a few $\mu$m. The configuration of the focus table makes the precise adjusting of this setup easy and fast.

Alternate Implementations: There may be various modifications and variations to the concepts and implementations disclosed here that are within the scope of the present invention including, but not limited to:

These techniques all work for area sources as well as line sources. Typically, positioning in five 5 axes is required for aligning a line scan, six axes of adjustment are required for area scan applications.

The alignment tooling is not limited to five axes of adjustment. Certainly, fewer axes could be used or a 6$^{th}$ axis could be added.

More lasers could be used to illuminate regions that span the area of an optical system's 2D object space. Spot generators could be used instead of multiple lasers.

These techniques are not limited to off-axis optical systems in the Scheimpflug condition. The alignment tooling and focus table are readily adaptable for normal on-axis viewing. The fold up concepts can fold and adjust for arbitrary angles, even multiple folds to a single optical path.

The alignment tooling could be configured to work in cases where the detector was held rigidly in place and the optics were floated into place.

These techniques can be used to adjust illumination sources, such as micro-displays, relative to projection optics, or projection optics relative to illumination sources. A camera observing the screen could be used to monitor the display alignment in much the same fashion the frame grabber is used above.

The base plate fold up could be reconfigured for the same results. For instance, the laser in FIG. 25 could be mounted in the kinematic mount and adjusted off a fixed mirror, or remounted so the turn mirror is not required.

The fold up scheme can also be extended to folding in 3*d* to further collapse the footprint of the optical path.

It is noted that the concepts within a particular section above may be utilized in any of the remaining sections. Such utilization will still fall within the scope of the present invention.

Those of ordinary skill in the art will recognize that various modifications and variations may be made to the embodiments described above without departing from the spirit and scope of the present invention. For example, the preceding techniques do not have to be implemented alone, they can be combined to produce hybrid techniques that might fit a specific application better than a single technique. It is therefore to be understood that the present invention is not limited to the particular embodiments disclosed above, but it is intended to cover such modifications and variations as defined by the following claims.

What is claimed is:

1. A system for mounting capable of high-precision alignment of a first element relative to a second element, the system comprising:
    at least one post having a first end and a second end, wherein the first end has a first end diameter, and wherein the second end has a second end diameter;
    a first element having the first end affixed thereto; and
    a second element having at least one hole, wherein the hole has a hole diameter which is greater than the second end diameter such that the second end is positioned within the hole, wherein a gap is provided within the hole, wherein the gap is between the second end and the second element, wherein a material is provided within the gap that serves to affix the second end to the second element.

2. The system of claim 1, wherein the material is capable of being in a deformable state and a solid state, wherein the deformable state allows for movement of the second end relative to the second element, and wherein the solid state allows for rigid support of the second end.

3. The system of claim 2, wherein the material is of the curable type to thereby form the solid state from the deformable state when cured.

4. The system of claim 2, wherein the material is capable of being transformed from the solid state to the deformable state by application of heat.

5. The system of claim 2, wherein the material is an adhesive.

6. The system of claim 5, wherein the adhesive is glue.

7. The system of claim 1, wherein the second element includes an access hole that allows for insertion of the material into the gap.

8. The system of claim 1, further comprising at least one bolt, wherein the post is hollow, wherein the first element includes a counter-bore having a threaded hole therewithin, wherein the first end is affixed to the counter-bore via the bolt threadably secured to the threaded hole through the hollow post.

9. The system of claim 1, wherein the post is hollow.

10. The system of claim 1, wherein the post is hollow and surrounds an optics path.

11. The system of claim 1, further comprising a dam positioned within the gap and surrounding the second end, wherein the dam extends from the second end to the second element, and wherein the material is confined to one side of the dam.

12. The system of claim 11, wherein the dam is a compliant O-ring.

13. The system of claim 1, wherein the hole is substantially cylindrical.

14. The system of claim 1, wherein the first element is an optics block.

15. The system of claim 14, wherein the second element is an optical detector mounting structure.

16. The system of claim 1, wherein the first element is an optical detector mounting structure.

17. The system of claim 16, wherein the second element is an optics block.

18. The system of claim 1, wherein the first element is an image source.

19. The system of claim 18, wherein the second element is an optics block.

20. The system of claim 14, wherein the second element is an image source.

21. The system of claim 14, wherein the second element is another optics block.

22. A system for mounting capable of high-precision alignment of a first element relative to a second element, the system comprising:
    a first hollow post having a first end and a second end, wherein the first end has a first end diameter, and wherein the second end has a second end diameter;
    a second hollow post having a first end and a second end, wherein the first end has a first end diameter, and wherein the second end has a second end diameter;
    a first element having the first end of the first hollow post affixed thereto; and
    a second element having the first end of the second hollow post affixed thereto, wherein the second end diameter of the first hollow post is greater than the second end diameter of the second hollow post such that the second hollow post is positioned at least partly within the first hollow post, wherein a gap is provided between the first hollow post and the second hollow post, wherein a material is provided within the gap that serves to affix the first hollow post to the second hollow post.

23. The system of claim 22, wherein the material is capable of being in a deformable state and a solid state, wherein the deformable state allows for movement of the first hollow post relative to the second hollow post, and wherein the solid state allows for rigid support of the first hollow post and the second hollow post.

24. The system of claim 23, wherein the material is of the curable type to thereby form the solid state from the deformable state when cured.

25. The system of claim 23, wherein the material is capable of being transformed from the solid state to the deformable state by application of heat.

26. The system of claim 23, wherein the material is an adhesive.

27. The system of claim 26, wherein the adhesive is glue.

28. The system of claim 22, wherein the first and second hollow posts surround an optics path.

29. The system of claim 22, wherein the first element is an optics block.

30. The system of claim 29, wherein the second element is an optical detector mounting structure.

31. The system of claim 22, wherein the first element is an optical detector mounting structure.

32. The system of claim 31, wherein the second element is an optics block.

33. The system of claim 22, wherein the first element is an image source.

34. The system of claim 33, wherein the second element is an optics block.

35. The system of claim 29, wherein the second element is an image source.

36. The system of claim 29, wherein the second element is another optics block.

37. A system for mounting capable of high-precision alignment of a first element relative to a second element, the system comprising:

at least one post having a first end and a second end, wherein the first end has a first end diameter, wherein the second end is at least partly spherical having a second end diameter, wherein the post has a shaft between the first end and the second end, and wherein the shaft has a shaft diameter which is less than the second end diameter;

a first element having the first end affixed thereto; and a second element having at least one hole, wherein the hole has a hole diameter which is greater than the shaft diameter, wherein the second end is positioned within the hole, and wherein the second end is clamped within the hole with a clamping element.

38. The system of claim 37, wherein the clamping element is a flexture clamp provided in the second element.

39. The system of claim 38, wherein the flexture clamp includes a clamping bolt which is capable of allowing movement within the hole of the second end relative to the second element when the clamping bolt is loosened, and wherein the clamping bolt is further capable of rigid support within the hole of the second end when the clamping bolt is tightened.

40. The system of claim 37, wherein the hole is substantially cylindrical.

41. The system of claim 37, wherein an intermediary sleeve is positioned in the hole between the second end and the second element.

42. The system of claim 37, wherein the first end is substantially identical to the second end and is clamped within a corresponding hole in the first element.

43. The system of claim 37, wherein the first element is an optics block.

44. The system of claim 43, wherein the second element is an optical detector mounting structure.

45. The system of claim 37, wherein the first element is an optical detector mounting structure.

46. The system of claim 45, wherein the second element is an optics block.

47. The system of claim 37, wherein the first element is an image source.

48. The system of claim 47, wherein the second element is an optics block.

49. The system of claim 43, wherein the second element is an image source.

50. The system of claim 43, wherein the second element is another optics block.

* * * * *